United States Patent
Xiong et al.

(10) Patent No.: US 12,341,700 B2
(45) Date of Patent: Jun. 24, 2025

(54) LOAD SHARING METHOD AND APPARATUS, AND CHIP

(71) Applicant: HUAWEI TECHNOLOGIES CO., LTD., Guangdong (CN)

(72) Inventors: Liudong Xiong, Xi'an (CN); Xiangang Zhang, Dongguan (CN); Chunzhi He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/454,188

(22) Filed: Aug. 23, 2023

(65) Prior Publication Data

US 2023/0396549 A1 Dec. 7, 2023

Related U.S. Application Data

(63) Continuation of application No. PCT/CN2022/076919, filed on Feb. 18, 2022.

(30) Foreign Application Priority Data

Feb. 24, 2021 (CN) .......................... 202110209432.3

(51) Int. Cl.
*H04L 47/125* (2022.01)
(52) U.S. Cl.
CPC ................... *H04L 47/125* (2013.01)
(58) Field of Classification Search
CPC ..................................................... H04L 47/125
See application file for complete search history.

(56) References Cited

U.S. PATENT DOCUMENTS

| 10,505,849 B1 | 12/2019 | Iny et al. |
| 2019/0190838 A1 | 6/2019 | Shpiner et al. |
| 2020/0169509 A1* | 5/2020 | Tigli .................... H04L 47/2483 |
| 2021/0119930 A1* | 4/2021 | Debbage ............... H04L 1/1642 |

FOREIGN PATENT DOCUMENTS

| CN | 1758632 A | 4/2006 |
| CN | 102404229 A | 4/2012 |
| CN | 107864101 A | 3/2018 |
| CN | 111147598 A | 5/2020 |
| CN | 111490944 A | 8/2020 |

OTHER PUBLICATIONS

Extended European Search Report dated Mar. 6, 2024, issued for European Application No. 22758815.9 (7 pages).
International Search Report dated May 19, 2022, issued for International Application No. PCT/CN2022/076919 (9 pages).

* cited by examiner

*Primary Examiner* — Suraj M Joshi

(57) ABSTRACT

This application provides a load sharing method and apparatus, and a chip, which are applicable to a scenario of a complex combination and hybrid procedure. When sending a data packet, a transmit end adds different values to a first field of the data packet for different flow types of data flows, to indicate a forwarding device to use different load sharing rules. When hybrid traffic exists in complex networking, different load sharing rules are used for traffic of different flow types. Compared with configuring the forwarding device to use a fixed load sharing rule for all traffic, a better load sharing effect can be achieved.

19 Claims, 11 Drawing Sheets

LOAD SHARING METHOD AND APPARATUS, AND CHIP

CROSS-REFERENCE TO RELATED APPLICATIONS

This application is a continuation of International Application No. PCT/CN2022/076919, filed on Feb. 18, 2022, which claims priority to Chinese Patent Application No. 202110209432.3, filed on Feb. 24, 2021. The disclosures of the aforementioned applications are hereby incorporated by reference in their entireties.

TECHNICAL FIELD

Embodiments of this disclosure relate to the field of network interconnection technologies, and in particular, to a load sharing method and apparatus, and a chip.

BACKGROUND

With the expansion of a network and the diversification of application scenarios, networking modes of a transmission network are diversified. A flow is sent from one network device to another network device through the transmission network. Generally, there are a plurality of feasible paths. The flow needs to be shared to the plurality of paths in the transmission network, to improve forwarding performance and network reliability, providing better services for users.

In an existing load sharing method, a flow-by-flow load sharing method is mainly used. To be specific, a device may divide an original packet into different flows by using a feature field of a data packet, such as a source internet protocol (IP) address, a destination IP address, a source media access control (MAC) address, a destination MAC address, and a port number, and determine a sending interface and a path in a bundling manner. Packets of a same flow are sent on a same interface and a same route. Alternatively, a flowlet is sent through a sending interface specified in a flow table by using a flowlet load sharing method based on the flow table. Alternatively, a packet-by-packet load sharing method is used. To be specific, a device selects a member link with a light load from existing load sharing links based on a data packet to forward the data packet, or sends the data packet through feasible paths in turn.

However, in the foregoing flow-by-flow load sharing method, when an elephant flow with a large bandwidth and a mouse flow with a small bandwidth coexist, problems of an uneven traffic load and low network utilization are easily caused. The elephant flow refers to a persistent data flow with a large capacity (a total quantity of bits) established on a network link. For example, the elephant flow may be generated due to data backup or virtual machine migration. The mouse flow refers to a data flow with a small capacity (a total quantity of bits) established on a network link. The mouse flow may be, for example, a transactional flow, a data flow generated by web world wide web (WWW) browsing, or a data flow generated by search and query. However, in the flowlet load sharing method based on the flow table, the device needs to store a large quantity of flow tables, and a forwarding delay is long. In the foregoing packet-by-packet load sharing method, a receive end needs to support a function of reordering disordered packets. The foregoing load sharing method for the transmission network is a global fixed configuration mode based on the transmission network, and is not applicable to a scenario of complex networking and hybrid traffic.

SUMMARY

Embodiments of this disclosure provides a load sharing method and apparatus, and a chip, which are applicable to a scenario of a complex combination and hybrid procedure.

According to a first aspect, an embodiment of this disclosure provides a load sharing method, applied to a transmit end. The method includes: sending a first data packet to a forwarding device, where the first data packet belongs to a first data flow, a value of a first field included in the first data packet is a first value, and the first value indicates the forwarding device to forward the first data packet according to a first load sharing rule; and sending a second data packet to the forwarding device, where the second data packet belongs to a second data flow, a value of a first field included in the second data packet is a second value, the second value indicates the forwarding device to forward the second data packet according to a second load sharing rule, and a flow type of the first data flow is different from a flow type of the second data flow. In this embodiment of this disclosure, when sending a data packet, a transmit end indicates the forwarding device to use different load sharing rules for different flow types of data flows. When hybrid traffic exists in complex networking, different load sharing rules are used for traffic of different flow types. Compared with configuring the forwarding device to use a fixed load sharing rule for all traffic, a better load sharing effect can be achieved.

In a possible implementation, the flow type of the first data flow is a mouse flow, and the flow type of the second data flow is an elephant flow.

In a possible implementation, the method further includes: before sending the first data packet to the forwarding device, determining, based on a service type or a data volume of the first data flow, that the flow type of the first data flow is a mouse flow; and before sending the second data packet to the forwarding device, determining, based on a service type or a data volume of the second data flow, that the flow type of the second data flow is an elephant flow. According to the foregoing implementation, a terminal side indicates, based on a traffic characteristic, the load sharing rule used by the forwarding device. In other words, the terminal side indicates, based on a traffic characteristic or a requirement of the terminal side, a load sharing rule used by a switch, so that the switch forwards a flow based on the load sharing rule indicated by the terminal side. When hybrid traffic exists in complex networking, different load sharing rules can be used for traffic of different flow types, and a better load sharing effect is achieved.

In a possible implementation, the first data flow is a data flow sent to a first receive end. The method may further include: determining, based on a capability of the first receive end for reordering disordered packets and the flow type of the first data flow, that the forwarding device forwards the first data flow according to the first load sharing rule. According to the foregoing implementation, the terminal side indicates, based on the traffic characteristic and the capability of the receive end for reordering disordered packets, the load sharing rule used by the forwarding device. In other words, the terminal side indicates, based on the traffic characteristic of the terminal side and the capability of the receive end for reordering disordered packets, the load sharing rule used by the switch, so that the switch forwards a flow according to the load sharing rule indicated by the terminal side. Compared with a fixed load sharing rule, a better load sharing effect can be achieved.

In a possible implementation, the method further includes: receiving capability information from the first receive end, where the capability information indicates whether the first receive end has the capability for reordering disordered packets.

In a possible implementation, the second data flow is a data flow sent to a second receive end. The method further includes: determining, based on a capability of the second receive end for reordering disordered packets and the flow type of the second data flow, that the forwarding device forwards the second data flow according to the second load sharing rule. According to the foregoing implementation, the terminal side indicates, based on the traffic characteristic and the capability of the receive end for reordering disordered packets, the load sharing rule used by the forwarding device. In other words, the terminal side indicates, based on the traffic characteristic of the terminal side and the capability of the receive end for reordering disordered packets, the load sharing rule used by the switch, so that the switch forwards a flow according to the load sharing rule indicated by the terminal side. Compared with a fixed load sharing rule, a better load sharing effect can be achieved.

In a possible implementation, for example, the first data flow is a mouse flow, and the first receive end has the capability for reordering disordered packets. The first load sharing rule is: selecting, from different transmission paths based on distances and congestion degrees of the different transmission paths to the first receive end, a transmission path for forwarding the first data packet; or using a shortest path to the first receive end as a forwarding path for forwarding the first data packet. According to the foregoing implementation, a receive end for a mouse flow has a capability for reordering disordered packets, so that the switch can select a transmission path according to the first load sharing rule based on a distance and a congestion degree of a transmission path, for example, select a closest and non-congested transmission path for forwarding, thereby ensuring a delay requirement of the mouse flow.

In a possible implementation, the first receive end does not have the capability for reordering disordered packets. The first data packet further includes a second field. A value of the second field included in the first data packet indicates a load sharing factor of the first data packet. The first load sharing rule is: using, based on the load sharing factor, a shortest path to the first receive end as a forwarding path for forwarding the first data packet. According to the foregoing implementation, a receive end for a mouse flow does not have a capability for reordering disordered packets, so that the switch can forward, according to the first load sharing rule and based on the load sharing factor, the data packet belonging to the first data flow.

In a possible implementation, the method further includes: sending a third data packet to the forwarding device, where the third data packet belongs to the first data flow, a value of a first field included in the third data packet is the first value, a destination address of the third data packet indicates the second receive end, the third data packet further include a second field, and a value of the second field included in the third data packet indicates a load sharing factor of the third data packet; and the value of the second field in the third data packet is the same as the value of the second field in the first data packet; or when a sending time interval between the third data packet and the first data packet is greater than first duration, the value of the second field in the third data packet is different from the value of the second field in the first data packet; or when a sending time interval between the third data packet and the first data packet is less than or equal to first duration, the value of the second field in the third data packet is different from the value of the second field in the first data packet.

In the foregoing implementation, a same load sharing factor is used for data packets belonging to a same data flow or a same load sharing factor is used for two data packets with a short time interval, so that mouse flows belonging to a same data flow can arrive at a receive end in sequence, and the receive end can receive the data packets belonging to the same data flow in sequence.

In a possible implementation, the second data packet further includes a second field. A value of the second field included in the second data packet indicates a load sharing factor of the second data packet. The value of the second field in the second data packet is different from the value of the second field in the third data packet. In the foregoing implementation, load sharing factors of data flows of different flow types are different.

In a possible implementation, for example, the second data flow belongs to an elephant flow. The second data packet further includes a second field. A value of the second field included in the second data packet indicates a load sharing factor of the second data packet. The second load sharing rule is: selecting, based on the load sharing factor and from at least one transmission path to the second receive end, a forwarding path for forwarding the second data packet. In the foregoing implementation, the terminal side indicates the forwarding device to select a path for each data packet of the elephant flow based on the load sharing factor. The elephant flow can be shared to a greatest extent by a plurality of transmission paths for transmission.

In a possible implementation, the second receive end does not have the capability for reordering disordered packets. The method further includes: sending a fourth data packet to the forwarding device, where the fourth data packet belongs to the second data flow, a value of a first field included in the fourth data packet is the second value, the fourth data packet further includes a second field, and a value of the second field included in the fourth data packet indicates a load sharing factor of the fourth data packet; and the value of the second field in the fourth data packet is the same as the value of the second field in the second data packet; or when the fourth data packet is adjacent to the second data packet and a sending time interval between the fourth data packet and the second data packet is greater than second duration, the value of the second field in the fourth data packet is different from the value of the second field in the second data packet; or when the fourth data packet is adjacent to the second data packet and a sending time interval between the fourth data packet and the second data packet is less than or equal to second duration, the value of the second field in the fourth data packet is the same as the value of the second field in the second data packet.

In the foregoing implementation, if the receive end does not have a capability for reordering disordered packets, a same load sharing factor is used for data packets belonging to a same data flow or a same load sharing factor is used for two data packets with a short time interval, so that elephant flows belonging to a same data flow can arrive at a receive end in sequence, and the receive end can receive the data packets belonging to the same data flow in sequence.

In a possible implementation, the second receive end has the capability for reordering disordered packets. The method further includes: sending a fifth data packet to the forwarding device, where the fifth data packet belongs to the second data flow, a value of a first field included in the fifth data packet is the second value, the fifth data packet further includes a second field, and a value of the second field included in the fifth data packet indicates a load sharing factor of the fifth data packet; and the value of the second field in the fifth data packet is different from the value of the second field in the second data packet; or when a sending time interval between the fifth data packet and the second data packet is greater than second duration, the value of the second field in the fifth data packet is different from the value of the second field in the second data packet; or when a sending time interval between the fifth data packet and the second data packet is less than or equal to second duration, the value of the second field in the fifth data packet is the same as a value of the second field in the second data packet; or when a quantity of packets between the fifth data packet and the second data packet is greater than a second quantity, the value of the second field in the fifth data packet is different from the value of the second field in the second data packet; or when a quantity of packets between the fifth data packet and the second data packet is less than or equal to a second quantity, the value of the second field in the fifth data packet is the same as the value of the second field in the second data packet.

In the foregoing implementation, if the receive end has a capability for reordering disordered packets, a same load sharing factor is used for data packets belonging to a same data flow or a same load sharing factor is used for two data packets with a short time interval, so that elephant flows belonging to a same data flow can arrive at a receive end in sequence, and the receive end can receive the data packets belonging to the same data flow in sequence.

According to a second aspect, this disclosure further provides a load sharing method, applied to a forwarding device. The method includes: receiving a first data packet, where the first data packet belongs to a first data flow, a value of a first field included in the first data packet is a first value, and forwarding the first data packet according to a first load sharing rule indicated by the first value; and receiving a second data packet, where the second data packet belongs to a second data flow, a value of a first field included in the second data packet is a second value, and forwarding the second data packet according to a second load sharing rule indicated by the second value; and a flow type of the first data flow is different from a flow type of the second data flow. In this embodiment of this disclosure, when sending a data packet, a transmit end indicates the forwarding device to use different load sharing rules for different flow types of data flows. When hybrid traffic exists in complex networking, different load sharing rules are used for traffic of different flow types. Compared with configuring the forwarding device to use a fixed load sharing rule for all traffic, a better load sharing effect can be achieved.

In a possible implementation, the flow type of the first data flow is a mouse flow, and the flow type of the second data flow is an elephant flow.

In a possible implementation, the first data flow is a data flow sent to a first receive end. The forwarding the first data packet according to a first load sharing rule indicated by the first value includes: selecting, from transmission paths based on distances and congestion degrees of the transmission paths to the first receive end, a first forwarding path for forwarding the first data packet; and the first forwarding path is a transmission path with a shortest distance in transmission paths whose congestion degrees are less than a first threshold.

In a possible implementation, the first data flow is a data flow sent to a first receive end. The first data packet further includes a second field. The second field indicates a load sharing factor. The forwarding the first data packet according to a first load sharing rule indicated by the first value includes: selecting, based on the load sharing factor and from at least one shortest path to the first receive end, a forwarding path for forwarding the first data packet.

In a possible implementation, the first data packet includes a first destination address. The first destination address indicates the first receive end. The selecting, based on the load sharing factor and from at least one shortest path to the second receive end, a forwarding path for forwarding the first data packet includes: determining, based on a routing table, at least one egress port that corresponds to the first destination address and whose cost values are in an ascending order, where the routing table includes a plurality of egress ports corresponding to the first destination address and a cost value corresponding to each egress port, and the cost value indicates a distance of a transmission path from the egress port corresponding to the cost value to the first receive end; and selecting a first egress port from the at least one egress port, where a congestion degree of the first egress port is less than a first threshold, and the first egress port is an egress port with a lowest load in the at least one egress port.

In a possible implementation, the first data packet includes a first destination address. The first destination address indicates the first receive end. The selecting, based on the load sharing factor and from at least one shortest path to the second receive end, a forwarding path for forwarding the first data packet includes: determining, based on a routing table, at least one egress port that corresponds to the first destination address and whose cost values are in an ascending order, where the routing table includes a plurality of egress ports corresponding to the first destination address and a cost value corresponding to each egress port, and the cost value indicates a distance of a transmission path from the egress port corresponding to the cost value to the first receive end; and selecting a first egress port from the at least one egress port, where the first egress port is an egress port with a lowest cost value and a lowest load in at least one egress port whose congestion degree is less than a first threshold.

In a possible implementation, the second data flow is a data flow sent to a second receive end. The forwarding the second data packet according to a second load sharing rule indicated by the second value includes: when the value of the first field is the second value, selecting, based on the load sharing factor and from at least one transmission path to the second receive end, a forwarding path for forwarding the second data packet.

According to a third aspect, an embodiment of this disclosure provides a load sharing apparatus. The method is applied to a transmit end, and may be implemented by a processor in the transmit end, or may be implemented by a network card in the transmit end. The load sharing apparatus includes a sending module.

The sending module is configured to send a first data packet to a forwarding device, where the first data packet belongs to a first data flow, a value of a first field included in the first data packet is a first value, and the first value indicates the forwarding device to forward the first data packet according to a first load sharing rule. The sending module is further configured to send a second data packet to the forwarding device, where the second data packet belongs to a second data flow, a value of a first field included in the second data packet is a second value, the second value indicates the forwarding device to forward the second data packet according to a second load sharing rule, and a flow type of the first data flow is different from a flow type of the second data flow.

In addition, in the third aspect, for another optional implementation of the load sharing apparatus, refer to related content in the first aspect. Details are not described herein again.

According to a fourth aspect, this disclosure further provides a load sharing apparatus. The apparatus is applied to a forwarding device, and may be implemented by a processor, a controller, or a chip in the forwarding device. The load sharing apparatus includes a receiving module and a sending module. The receiving module is configured to receive a first data packet, where the first data packet belongs to a first data flow, a value of a first field included in the first data packet is a first value. The sending module is configured to forward the first data packet according to a first load sharing rule indicated by the first value. The receiving module is further configured to receive a second data packet, where the second data packet belongs to a second data flow, a value of a first field included in the second data packet is a second value. The sending module is further configured to forward the second data packet according to a second load sharing rule indicated by the second value. A flow type of the first data flow is different from a flow type of the second data flow.

In addition, in the fourth aspect, for another optional implementation of the load sharing apparatus, refer to related content in the second aspect. Details are not described herein again.

According to a fifth aspect, a load sharing apparatus is provided. The load sharing apparatus includes a processor and an intelligent network card (briefly referred to as a network card). The processor is configured to receive a data flow sent by the network card, or send a data flow to the network card. The intelligent network card is configured to implement the method according to any one of the implementations of the first aspect to the second aspect.

According to a sixth aspect, a chip is provided. The chip includes a controller and an interface. The controller and the interface cooperate with each other, so that the chip performs the method according to any one of the implementations of the first aspect to the second aspect.

According to a seventh aspect, this disclosure provides a chip, including a memory and a controller. The memory is configured to store a computer program. The controller is configured to execute the computing program stored in the memory, to implement the method according to any one of the possible implementations of the first aspect to the second aspect.

According to an eighth aspect, a computer-readable storage medium is provided. The computer-readable storage medium stores instructions. When the instructions are run on a computer, the computer is enabled to perform the method according to any one of the implementations of the first aspect to the second aspect.

According to a ninth aspect, a computer program product is provided. When the computer program product is run on a computer, the computer is enabled to perform the method according to any one of the implementations of the first aspect to the second aspect.

For beneficial effects of the third aspect to the ninth aspect, refer to related descriptions in the first aspect to the second aspect. Details are not described herein again.

DESCRIPTION OF EMBODIMENTS

Figure 1:
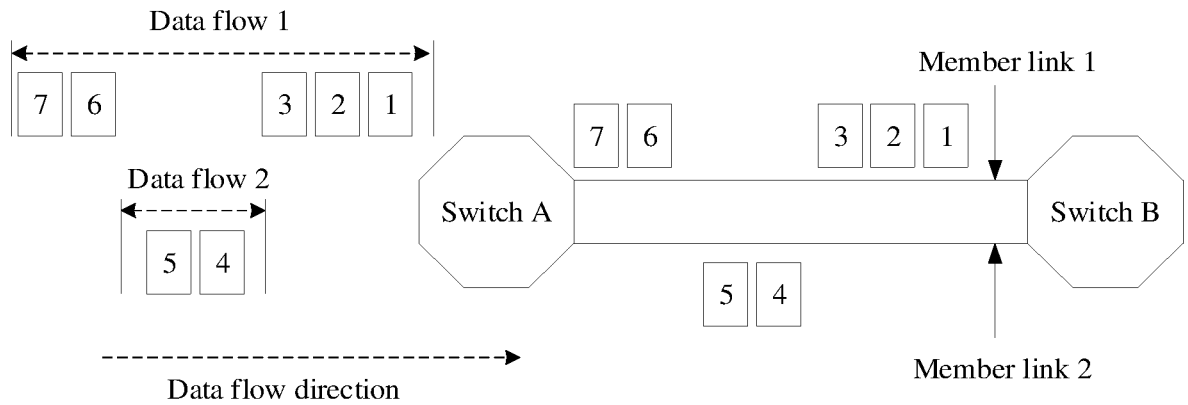
FIG. 1 is a schematic diagram of a possible flow-by-flow load sharing method according to an embodiment of this disclosure.

In the descriptions of embodiments of this disclosure, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists. At least one of the following items (pieces) or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments of this disclosure, unless otherwise specified, "a plurality of" means two or more than two.

In addition, in embodiments of this disclosure, the word "example" or "for example" is used to represent giving an example, an illustration, or a description. Any embodiment or design scheme described as an "example" or "for example" in embodiments of this disclosure should not be explained as being more preferred or having more advantages than another embodiment or design scheme. Exactly, use of the word such as "example" or "for example" is intended to present a relative concept in a specific manner.

It should be noted that in embodiments of this disclosure, similar reference numerals and letters represent similar items in the following accompanying drawings. Therefore, once an item is defined in one accompanying drawing, the item does not need to be further defined and explained in the following accompanying drawings.

In the descriptions of this disclosure, it should be further noted that, unless otherwise specified and limited, the terms "setting", "installation", "connected to", and "connection" shall be understood in a broad sense. For example, the terms may be a fixed connection, a detachable connection, or an integrated connection; the terms may be a mechanical connection, or an electrical connection; and the terms may be a direct connection, an indirect connection through an intermediate medium, or a connection inside two elements. An ordinary technician in the art may understand specific meanings of the foregoing terms in this disclosure based on a specific situation.

Embodiments of this disclosure may be applied to a communication network such as an Ethernet (ETH)/internet protocol (IP)/infinite bandwidth (IB) network.

Load sharing methods that may be used in an ETH/IP network may include (1) flow-by-flow load sharing, (2) flowlet load sharing based on a flow table, and (3) packet-by-packet load sharing. The following describes the foregoing three load sharing methods.

(1) Flow-by-flow load sharing. For example, a conventional link aggregation or equal-cost multi-path routing (ECMP) system generally uses a flow-by-flow load sharing method. In the flow-by-flow load sharing method, a characteristic field of a data packet is generally used as a hash factor, such as a source MAC address, a destination MAC address, a source IP address, a destination IP address, and a TCP/UDP port number. A hash algorithm is used to perform hash calculation on the hash factor to obtain a calculation result value. Then, a member link is selected from load sharing links based on the hash calculation result value to forward the data packet. By using the flow-by-flow load sharing method, different data flows can be forwarded on different member links, and a time sequence of data packets in a same data flow to reach a receive end can be ensured.

For example, FIG. 1 is a schematic diagram of a possible flow-by-flow load sharing method. There are at least two member links between a switch A and a switch B: a member link 1 and a member link 2. In FIG. 1, a data flow 1 is transmitted on the member link 1. In other words, data packets 1, 2, 3, 6, and 7 belonging to the data flow 1 are transmitted on the member link 1. A data flow 2 is transmitted on the member link 2. In other words, data packets 4 and 5 belonging to the data flow 2 are transmitted on the member link 2.

(2) Flowlet load sharing based on a flow table. Flowlets are a plurality of subflows obtained by dividing a data flow at a specific time interval. Different flowlets select paths independently, and may be shared to different member links or a same member link. Different flowlets correspond to different flowlet flow table entries. The flowlet flow table entry indicates a forwarding path of a data packet included in each flowlet. When forwarding a data packet, a switch measures a time interval between the data packet to be forwarded and a previous data packet in a data flow to which the data packet to be forwarded belongs. If the time interval is greater than a largest link transmission delay of each member link in load sharing links, the switch considers the data packet to be forwarded as a first packet of a new flowlet. If the time interval is less than a largest link transmission delay of each member link in load sharing links, the switch considers that the data packet to be forwarded and the previous data packet belong to a same flowlet. The switch selects a current member link with a lighter load from the load sharing links based on the flowlet. Data packets in the same flowlet are forwarded on the same link.

Figure 2:
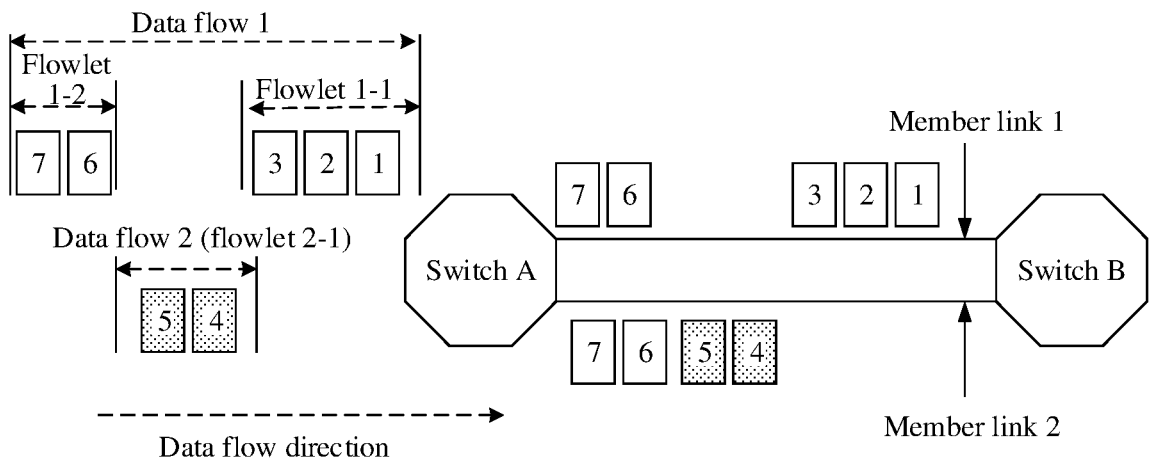
FIG. 2 is a schematic diagram of a possible flow-based flowlet load sharing method according to an embodiment of this disclosure.

For example, as shown in FIG. 2, there are at least two member links between a switch A and a switch B: a member link 1 and a member link 2. A data flow 1 is divided into a flowlet 1-1 and a flowlet 1-2. A data flow 2 includes only a flowlet 2-1. In FIG. 2, the flowlet 1-1 of the data flow 1 is transmitted on the member link 1, and the flowlet 1-2 of the data flow 1 is transmitted on the member link 2. In other words, data packets 1, 2, and 3 belonging to the data flow 1 are transmitted on the member link 1, and data packets 6 and 7 belonging to the data flow 1 are transmitted on the member link 2. The flowlet 2-1 of the data flow 2 is transmitted on the member link 2. In other words, data packets 4 and 5 belonging to the data flow 2 are transmitted on the member link 2.

(3) Packet-by-packet load sharing. In one manner, a switch selects, based on a data packet, a current member link with a lighter load from load sharing links for forwarding. In another manner, a switch sends a data packet through feasible paths in turn. In other words, the data packet is shared to the feasible paths in turn at arrival time of the data packet for forwarding. When packet-by-packet load sharing is used, for two adjacent data packets belonging to a same data flow, member links selected by the switch for the two adjacent data packets may be the same or may be different.

Figure 3:
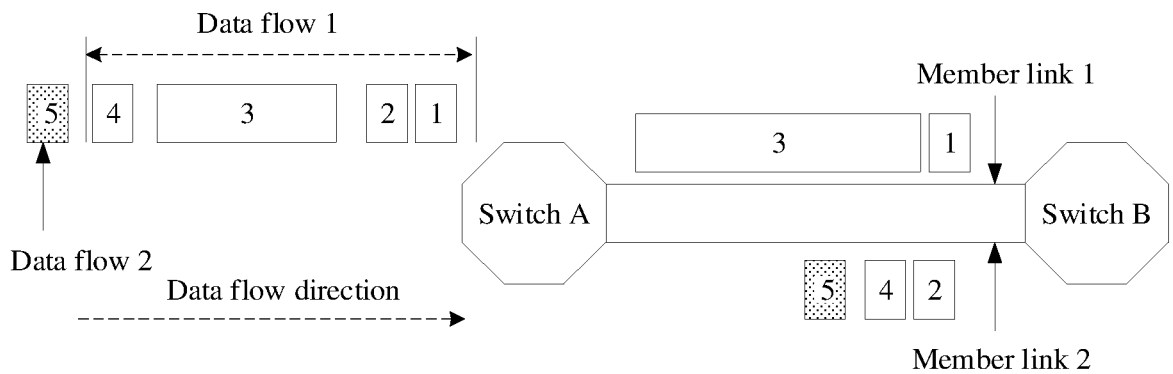
FIG. 3 is a schematic diagram of a possible packet-by-packet load sharing method according to an embodiment of this disclosure.

For example, as shown in FIG. 3, there are at least two member links between a switch A and a switch B: a member link 1 and a member link 2. In FIG. 3, data packets that arrive at the switch A in a time sequence are sequentially a data packet 1, a data packet 2, a data packet 3, and a data packet 4 that belong to a data flow 1, and a data packet 5 that belongs to a data flow 2. In FIG. 3, the data packet 1 and the data packet 3 are transmitted on the member link 1, and the data packet 2, the data packet 4, and the data packet 5 are transmitted on the member link 2.

A load sharing method that may be used in an IB network may include (4) flow-by-flow load sharing or (2) adaptive routing load sharing. The following describes the foregoing two load sharing methods.

(4) Flow-by-flow load sharing in an IB network. This method is similar to the flow-by-flow load sharing method applied to ETH. A switch in the IB network queries a forwarding table based on characteristic information of a data packet, for example, a destination local identifier (LID), and forwards the data packet based on a query result of querying the forwarding table. The LID is a number that is allocated to a network card in a host by a controller for controlling the switch in the IB network and that is used for forwarding a data packet. Generally, the controller allocates a plurality of LIDs to network cards, so that a network card of a transmit end encapsulates different destination LIDs for different data flows, and in a route configured by the switch, data flows that use different LIDs are forwarded on different member links. It may be understood that the network card of the transmit end selects one LID for each data flow, and different destination LIDs indicate that different paths are used in the switch network.

(5) Adaptive routing load sharing solution in an IB network. The adaptive routing load sharing solution supports two adaptive routing modes: a free mode and a bounded mode.

A load sharing method in the free mode is similar to a packet-by-packet load sharing method applied to an ETH/IP network. For each data packet, a switch selects a member link with a lightest load to send the data packet based on a congestion degree of an egress port of the switch. A load sharing method in the bounded mode is similar to a flowlet load sharing method based on a flow table applied to an ETH/IP network.

From the foregoing description, it may be learned that a load sharing method in a current network basically includes the following three methods: (1) A flow-by-flow load sharing technology is a method in which load sharing is performed based on a characteristic field (for example, a quintuple or an LID) of a data packet, and may also be referred to as static load sharing. However, this method does not consider utilization of each member link in load sharing links, and load unbalance of the member links may occur. Especially, when there are large data flows, severe congestion or even packet loss may occur on the selected member links. (2) A flowlet load sharing method (or a load sharing technology in the bounded mode) based on a flow table has a better effect than flow-by-flow load sharing. However, it is complex for the switch to identify flowlets, and a large quantity of flow tables need to be stored, affecting forwarding delay. The switch uses a fixed flowlet time interval. If the time interval is excessively short, packet disorder may occur. If the time interval is excessively long, a load sharing effect is poor. (3) A packet-by-packet or adaptive routing load sharing technology in the free mode has a better load sharing effect than the foregoing two methods. In this method, a receive end of traffic needs to support a function of reordering disordered packets.

In a network system, currently one of the foregoing three load sharing methods is used for performing global fixed configuration based on a switch. In a scenario of complex networking and hybrid traffic, a load sharing effect cannot be ensured.

Based on this, embodiments of this disclosure provide a load sharing method and apparatus. Based on a traffic characteristic of a terminal side or a requirement of a terminal side, the terminal side indicates a load sharing rule used by a switch, so that the load sharing method and apparatus can be adapted to a scenario of complex networking and hybrid traffic. In an existing manner of performing global fixed configuration based on a switch, a traffic characteristic of a terminal side or a requirement of a terminal side is not considered, for example, whether a bandwidth is preferred or a latency is preferred. A flow needs to be shared to a plurality of paths to a greatest extent if the bandwidth is preferred, and a shortest path needs to be used if the latency is preferred. No matter which fixed load sharing rule is used by the switch, various different requirements of traffic may be balanced in a case of complex networking and hybrid traffic. Therefore, in this embodiment of this disclosure, the terminal side determines the load sharing rule based on the traffic characteristic, and indicates the load sharing rule used by the switch. In other words, the terminal side indicates, based on a traffic characteristic or a requirement of the terminal side, a load sharing rule used by the switch, so that the switch forwards a flow based on the load sharing rule indicated by the terminal side. When hybrid traffic exists in complex networking, different load sharing rules can be used for traffic of different flow types, and a better load sharing effect is achieved.

The following describes in detail the solution in this disclosure by using specific embodiments.

This embodiment of this disclosure may be applied to a network system including a transmit end and a receive end, and the transmit end and the receive end are connected through a plurality of forwarding devices. The transmit end and the receive end may be a host server, a personal computer, or the like configured to generate or receive a data packet. The forwarding device may be a forwarding device responsible for forwarding a data packet, such as a router, a switch, or a forwarder.

Figure 4:
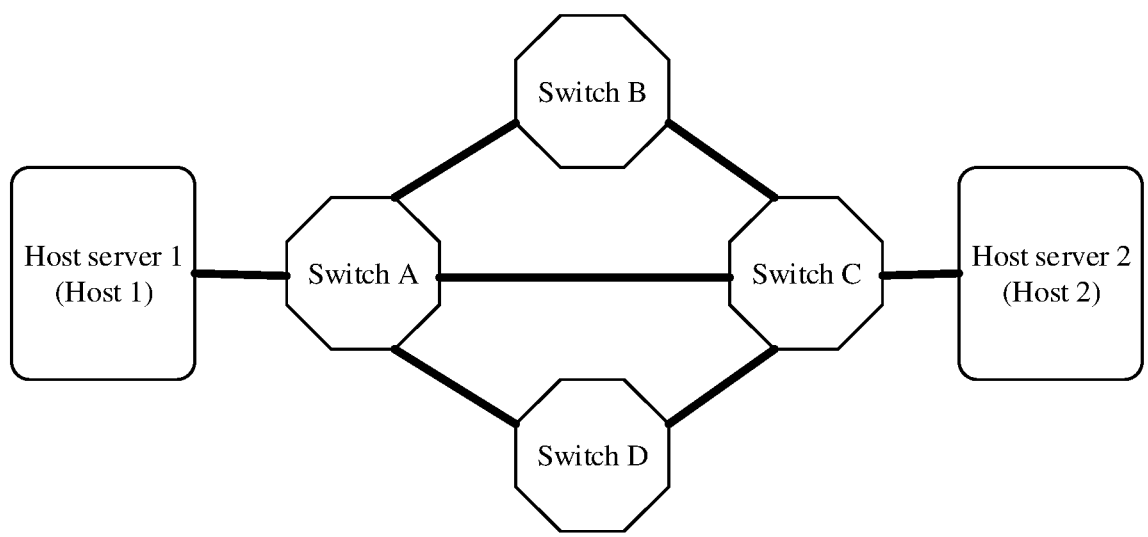
FIG. 4 is a schematic diagram of a possible architecture of a network system according to an embodiment of this disclosure.

In an example, FIG. 4 is a schematic diagram of a possible architecture of a network system. The network system includes at least two host servers. The communication connection is established between the host servers. In an example, the host servers may be interconnected through a switch network and/or a router network. In FIG. 4, two host servers are used as an example, and the two host servers communicate with each other through a switch A to a switch D. It should be understood that FIG. 4 is merely an example, and does not limit a quantity of host servers and a quantity of switches included in the network system. In the following description, the host server may be briefly referred to as a host.

Figure 5:
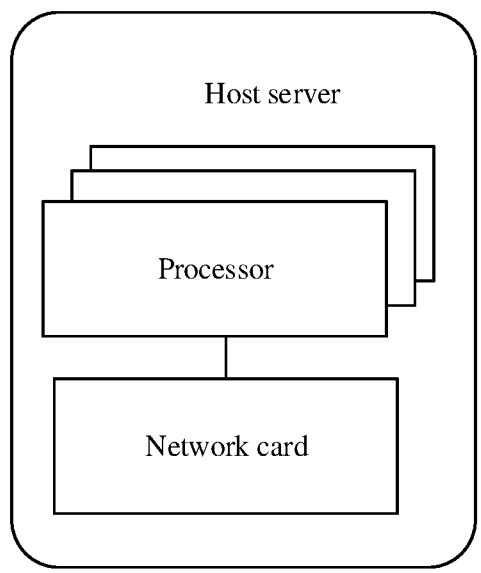
FIG. 5 is a schematic diagram of a possible structure of a host server according to an embodiment of this disclosure.

In an example, as shown in FIG. 5, the host server may include a network card and one or more processors. The processor may be a general-purpose central processing unit (CPU), a microprocessor, an application specific integrated circuit (ASIC), or one or more integrated circuits, or a graphics processing unit (GPU) configured to execute a related program, to implement the technical solutions provided in embodiments of this disclosure. The network card may be referred to as a network card of the processing unit. The network card may alternatively be referred to as a network interface card, a network adapter, a physical network interface, or the like.

For a scenario of complex networking and hybrid traffic, in this embodiment of this disclosure, a first field is added to a data packet, and different values of the first field indicate different load sharing rules. Different load sharing rules may be used for data flows of different flow types. A transmit end may add different values to the first field, so that a switch may forward a packet according to a load sharing rule indicated by a value of the first field. In an example, the first field may be referred to as a routing mode (RM), or the first field may have another name. This is not specifically limited in this disclosure. In the following description, the RM is used as an example.

Several possible load sharing rules are described below as an example.

(1) A load sharing rule 1 is a flow-based path selection mode, and a path is selected from all feasible paths.

In a first possible example, for a plurality of data packets included in one data flow, a transmission path is selected from all the feasible paths. Different transmission paths are selected for different data flows on a terminal side, and a same transmission path is selected for different data packets of a same data flow.

In a second possible example, for each data packet included in a same data flow, a transmission path is selected from all feasible paths. For example, when there are a plurality of all feasible paths, different transmission paths are selected for two adjacent data packets.

In a third possible example, when there are a plurality of all feasible paths, a same transmission path may be selected for N consecutive data packets. It may be understood that data packets included in a same data flow are grouped, and a same transmission path is selected for N consecutive data packets in a group. Different transmission paths are selected for two adjacent data packet groups.

In a fourth possible example, when there are a plurality of all feasible paths, a same transmission path may be selected for data packets in a same time period. It may be understood that N consecutive data packets in one time period form one group, and a same transmission path is selected for data packets in a same group. Different transmission paths are selected for data packet groups in adjacent time periods.

In a fifth possible example, when there are a plurality of all feasible paths, a transmission path may be selected from the plurality of feasible paths based on a traffic burst. For example, if a time interval between two adjacent data packets is less than first duration, a same transmission path is used for sending. It may be understood that if a sending time interval between a later sent data packet and a previous sent data packet is less than the first duration, the later sent data packet and the previous sent data packet belong to a same group (which may also be referred to as a flowlet), and a time interval between two adjacent data packets is greater than the first duration, different transmission paths are used for sending.

(2) A load sharing rule 2 is a flow-based path selection mode, and a path is selected from shortest feasible paths.

In a sixth possible example, for a plurality of data packets included in one data flow, one transmission path is selected from the shortest feasible paths. When there are a plurality of shortest feasible paths, different transmission paths are selected for different data flows on a terminal side, and a same transmission path is selected for different data packets of a same data flow.

In a seventh possible example, for each data packet included in a same data flow, a transmission path is selected from the shortest feasible paths. For example, when there are a plurality of shortest feasible paths, different transmission paths may be selected for two adjacent data packets.

In an eighth possible example, when there are a plurality of shortest feasible paths, a same transmission path may be selected for N consecutive data packets. It may be understood that data packets included in a same data flow are grouped, and a same transmission path is selected for N consecutive data packets in a group. Different transmission paths are selected for two adjacent data packet groups.

In a ninth possible example, when there are a plurality of shortest feasible paths, a same transmission path may be selected for data packets in a same time period. It may be understood that N consecutive data packets in one time period form one group, and a same transmission path is selected for data packets in a same group. Different transmission paths are selected for data packet groups in adjacent time periods.

In a tenth possible example, when there are a plurality of shortest feasible paths, a transmission path may be selected from the plurality of shortest feasible paths based on a traffic burst. For example, if a time interval between two adjacent data packets is less than first duration, a same transmission path is used for sending. If a time interval between two adjacent data packets is greater than first duration, different transmission paths are used for sending.

(3) A load sharing rule 3 is an adaptive routing path selection mode, and a path is selected from all feasible paths.

In an eleventh possible example, a transmission path is selected based on distances and congestion degrees of all feasible paths.

(4) A load sharing rule 4 is an adaptive routing path selection mode, and a path is selected from shortest feasible paths.

In a twelfth possible example, a transmission path is selected from one or more shortest feasible paths based on a load of the shortest feasible path. For example, when there are a plurality of shortest feasible paths, a shortest feasible path with a lowest load is selected.

In a possible implementation, when the load sharing rule 1 and the load sharing rule 2 are implemented, when it is determined that a flow-based selection mode is used, how a switch specifically performs selection from shortest feasible paths or all feasible paths may be indicated by a terminal side. In a possible example, a second field is added to the data packet, and the second field indicates a load sharing factor. In this way, the switch can select a transmission path based on the load sharing factor. The second field may be referred to as load balance (LB), or the second field may have another name. This is not specifically limited in this disclosure. In the following description, the LB is used as an example.

When encapsulating a data packet for a to-be-sent data flow, the transmit end encapsulates the RM and the LB into the data packet, where the RM indicates a load sharing rule used by a forwarding device, the LB indicates a load sharing factor, and the load sharing factor is used to select a transmission path. After receiving the data packet, the switch may select a transmission path according to a load sharing rule determined by the RM and an indication of the LB. In an example, the switch may perform a hash operation on a value of the LB to obtain a hash value, perform a modulo operation on a quantity of paths that can be selected based on the obtained hash value, and use a path corresponding to a result of the modulo operation as a selected forwarding path. In another example, the switch may perform a hash operation on a value of the LB and one or more items included in a quintuple in the data packet, to obtain a hash value, then perform a modulo operation on a quantity of paths that can be selected based on the obtained hash value, and use a path corresponding to a result of the modulo operation as a selected forwarding path. The quintuple may include a source IP address, a destination IP address, a source port number, a destination port number, and a protocol number.

In this embodiment of this disclosure, different values of the RM may indicate different load sharing rules. A mapping relationship between different values of the RM and the load sharing rules may be configured by a network manager for each network device and switch, or may be specified in a protocol. Different values of the LB are used to select a transmission path. A value range of the LB may be separately configured by the network manager for each network device, or may be specified in a protocol.

In an example, the load sharing rule 1 to the load sharing rule 4 are used as an example. The RM may occupy 2 bits. Different values of the RM indicate different load sharing rules 1 to 4. In a possible value configuration manner, one bit indicates a flow-based path selection mode or an adaptive routing path selection mode, and the other bit indicates that a path is selected from all feasible paths or from shortest feasible paths. For example, a high bit indicates a path selection mode, and a low bit indicates a range of transmission paths that can be selected. For another example, a low bit indicates a path selection mode, and a high bit indicates a range of transmission paths that can be selected. For example, refer to Table 1. In Table 1, an example in which the LB occupies 8 bits is used. Table 1 is merely an example, and does not specifically limit a quantity of bits occupied by the RM and a quantity of bits occupied by the LB.

TABLE 1

| Data packet field | Parsing |
|---|---|
| RM (2 bits) | [0:1]: The value 0 indicates a flow-based path selection mode, and the value 1 indicates an adaptive routing path selection mode. [1:1]: The value 0 indicates that a path is selected from all feasible paths, and the value 1 indicates that a path is selected from shortest feasible paths. |
| LB (8 bits) | This indicates a load sharing factor. In a flow-based path selection mode, a packet LB field of a flow can remain unchanged, change for N consecutive packets, change for each traffic burst, or change for each packet. |

The following describes in detail the first possible example to the twelfth possible example with reference to the accompanying drawings.

Example 1: A first possible example is described as follows: A transmit end side indicates, in a data packet included in a data flow, a switch to use the load sharing rule 1, and uses a same value in the LB when encapsulating data packets belonging to a same data flow.

Figure 6A:
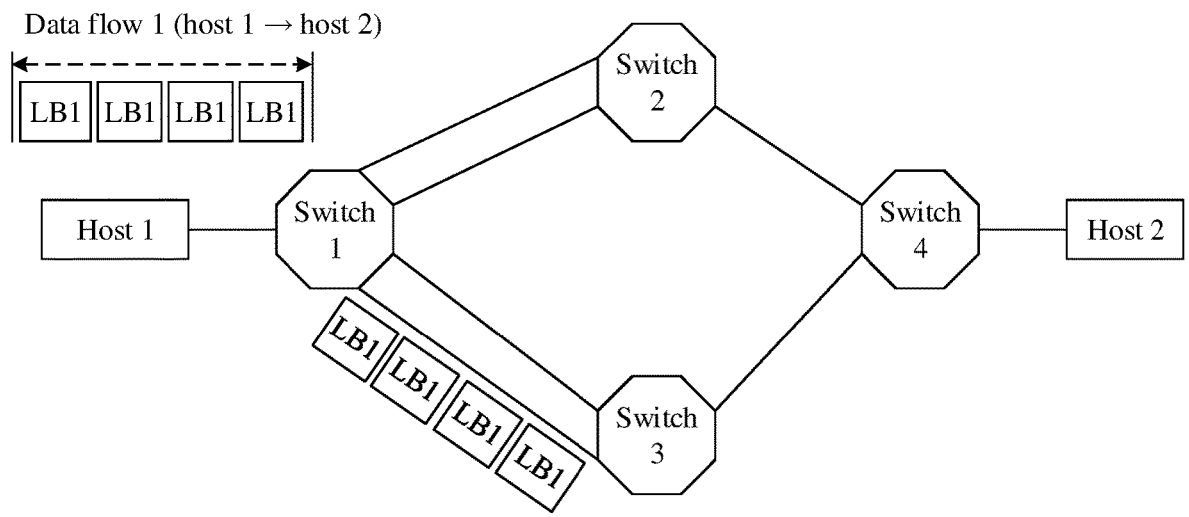
FIG. 6A is a schematic diagram of a load sharing method in Example 1 according to an embodiment of this disclosure.

For example, as shown in FIG. 6A, Table 1 is used as an example. An RM value is 0b00, indicating that the load sharing rule 1, namely, the flow-based path selection mode, is used to select a path from all feasible paths. A data flow 1 from a host 1 to a host 2 is used as an example. RM values of data packets belonging to the data flow 1 are all 0b00, and values of LB fields are all LB1. Therefore, when receiving the data packets belonging to the data flow 1, a switch 1 determines that there are four feasible paths from the switch 1 to the host 2, and may select one transmission path from the four feasible paths for transmission based on the values of the LB fields. The transmit end may configure different values for LB fields of data packets in different flows. It may be understood that different flows may be data flows sent within specified duration.

Example 2: A second possible example is described as follows: A transmit end side indicates, in a data packet included in a data flow, a switch to use the load sharing rule 1, and uses different values in the second field when encapsulating two adjacent data packets belonging to a same data flow. The LB values of data packets in a data flow change packet by packet. A load is shared to a plurality of paths packet by packet, and a load sharing effect is good. However, a disorder degree is high, and a receive end needs to have a capability for reordering disordered packets.

Figure 6B:
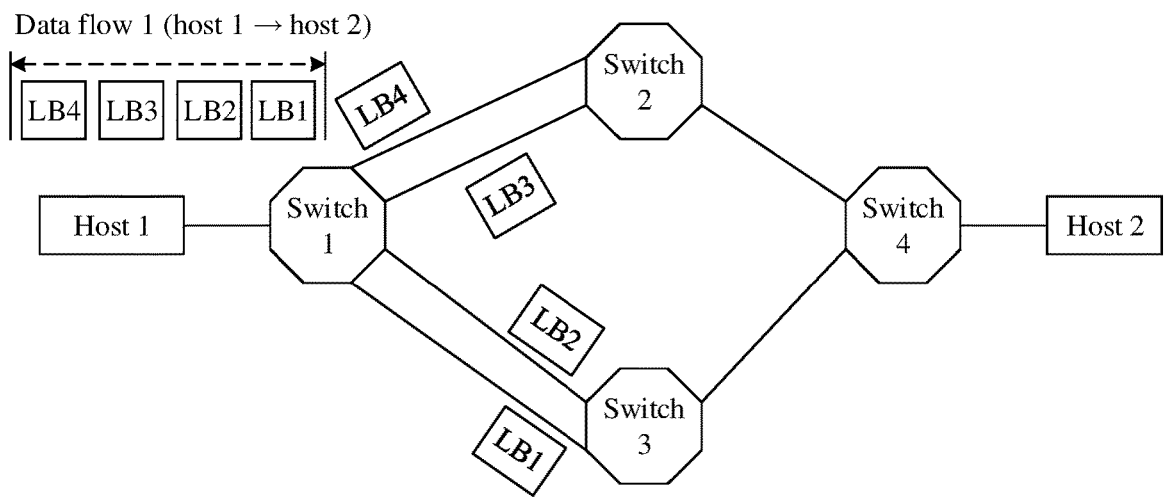
FIG. 6B is a schematic diagram of a load sharing method in Example 2 according to an embodiment of this disclosure.

For example, as shown in FIG. 6B, Table 1 is used as an example. An RM value is 0b00, indicating that the load sharing rule 1, namely, the flow-based path selection mode, is used to select a path from all feasible paths. A data flow 1 from a host 1 to a host 2 is used as an example. RM values of data packets belonging to the data flow 1 are all 0b00. As shown in FIG. 6B, values of LB fields of four data packets belonging to the data flow are respectively LB1, LB2, LB3, and LB4. Therefore, when receiving the data packets belonging to the data flow 1, a switch 1 determines that there are four feasible paths from the switch 1 to the host 2, and may perform a hash operation based on a value of the LB field (or a value of the LB field and a quintuple) to select one transmission path from the four feasible paths for transmission. Because LB values of four data packets of a same data flow are different, the four data packets are shared to four transmission paths for transmission after a hash operation.

Example 3: A second possible example to a fifth possible example are described as follows: A transmit end side indicates, in data packets included in a data flow, a switch to use the load sharing rule 1, and groups data packets belonging to a same data flow. Values of second fields in data packets belonging to a same group (a same flowlet) are the same. LB values of data packets in a data flow change group by group.

Figure 6C:
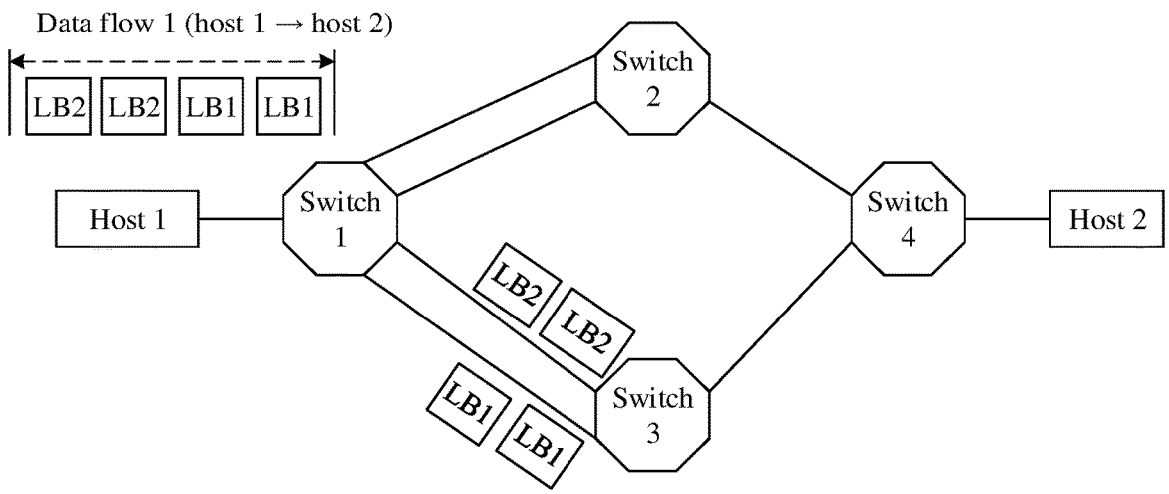
FIG. 6C is a schematic diagram of a load sharing method in Example 3 according to an embodiment of this disclosure.

For example, as shown in FIG. 6C, Table 1 is used as an example. An RM value is 0b00, indicating that the load sharing rule 1, namely, the flow-based path selection mode, is used to select a path from all feasible paths. A data flow 1 from a host 1 to a host 2 is used as an example. RM values of data packets belonging to the data flow 1 are all 0b00. As shown in FIG. 6C, values of LB fields of four data packets belonging to the data flow are respectively LB1, LB1, LB2, and LB2. Therefore, when receiving the data packets belonging to the data flow 1, a switch 1 determines that there are four feasible paths from the switch 1 to the host 2, and may perform a hash operation based on a value of the LB field (or a value of the LB field and a quintuple) to select one transmission path from the four feasible paths for transmission. Data packets with a same LB value are forwarded through a same transmission path, and data packets with different LB values are forwarded through different transmission paths.

Example 4: A sixth possible example is described as follows: A transmit end side indicates, in a data packet included in a data flow, a switch to use the load sharing rule 2 (to select a path from shortest feasible paths), and uses a same value in the second field when encapsulating data packets belonging to a same data flow.

In an example, in this embodiment of this disclosure, a routing table configured by the switch may include a cost value for indicating a distance of each transmission path. A smaller cost value indicates a shorter transmission path. For example, refer to a routing table shown in Table 2. In Table 2, different egress ports correspond to different transmission paths.

TABLE 2

| Index | Egress port | Cost value |
|---|---|---|
| Destination address | Port 1 | Cost 1 |
|  | Port 2 | Cost 2 |
|  | . . . | . . . |
|  | Port N | Cost N |

Therefore, the switch may determine one or more feasible paths based on the routing table, and may determine a shortest path from the one or more feasible paths based on the cost value. It should be understood that, if only one feasible path exists, the feasible path is a shortest feasible path.

Figure 7A:
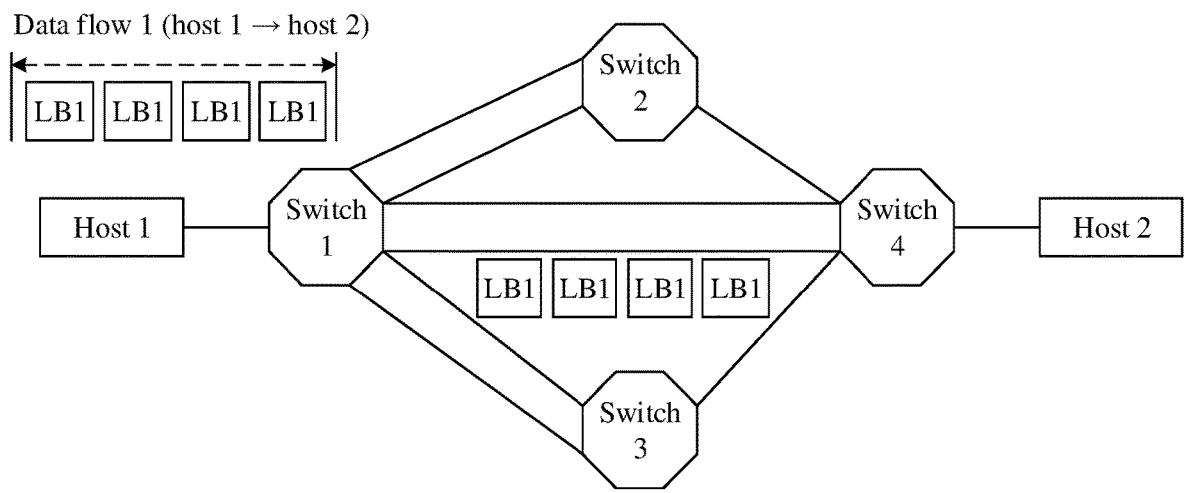
FIG. 7A is a schematic diagram of a load sharing method in Example 4 according to an embodiment of this disclosure.

For example, as shown in FIG. 7A, Table 1 is used as an example. An RM value is 0b10, indicating that the load sharing rule 2, namely, the flow-based path selection mode, is used to select a path from shortest feasible paths. A data flow 1 from a host 1 to a host 2 is used as an example. RM values of data packets belonging to the data flow 1 are all 0b00, and values of LB fields are all LB1. Therefore, when receiving the data packets belonging to the data flow 1, a switch 1 determines a shortest feasible path from the switch 1 to the host 2, and may determine the shortest feasible path from all feasible paths based on the routing table. As shown in FIG. 7A, there are two shortest feasible paths. Further, one transmission path may be selected from the two feasible paths based on the values of the LB fields to transmit the data flow 1. The transmit end may configure different values for LB fields of data packets in different flows.

Example 5: A seventh possible example is described as follows: A transmit end side indicates, in a data packet included in a data flow, a switch to use the load sharing rule 2, and uses different values in the second field when encapsulating two adjacent data packets belonging to a same data flow. The LB values of data packets in a data flow change packet by packet. A load is shared to a plurality of shortest paths packet by packet, and a load sharing effect is good. However, a disorder degree is high, and a receive end needs to have a capability for reordering disordered packets.

Figure 7B:
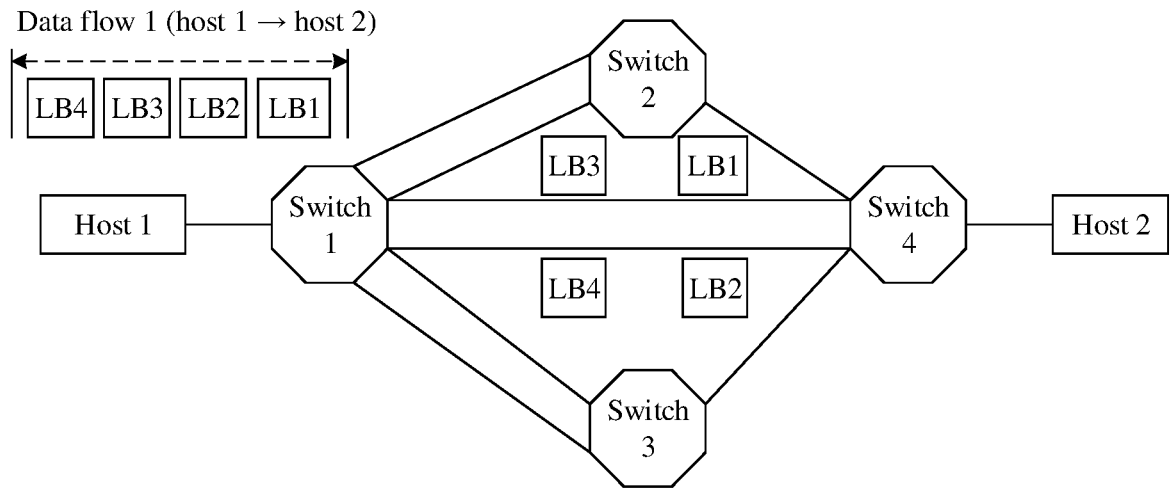
FIG. 7B is a schematic diagram of a load sharing method in Example 5 according to an embodiment of this disclosure.

For example, as shown in FIG. 7B, Table 1 is used as an example. An RM value is 0b10, indicating that the load sharing rule 2, namely, the flow-based path selection mode, is used to select a path from all feasible paths. A data flow 1 from a host 1 to a host 2 is used as an example. RM values of data packets belonging to the data flow 1 are all 0b10. As shown in FIG. 7B, values of LB fields of four data packets belonging to the data flow 1 are respectively LB1, LB2, LB3, and LB4. Therefore, when receiving the data packets belonging to the data flow 1, a switch 1 determines that there are two shortest feasible paths from the switch 1 to the host 2, and may perform a hash operation based on a value of the LB field (or a value of the LB field and a quintuple) to select a transmission path from the two feasible paths for transmission. Therefore, the four data packets of the data flow 1 are shared to the two shortest feasible paths for transmission.

Example 6: An eighth possible example to a tenth possible example are described as follows: A transmit end side indicates, in data packets included in a data flow, a switch to use the load sharing rule 2, and groups data packets belonging to a same data flow. Values of second fields in data packets belonging to a same group (a same flowlet) are the same. LB values of data packets in a data flow change group by group.

Figure 7C:
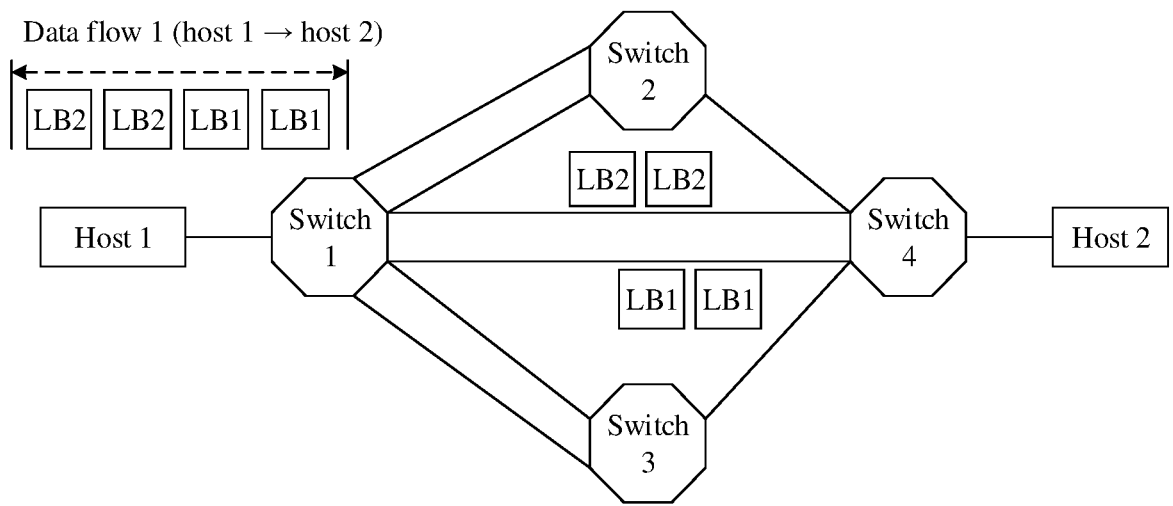
FIG. 7C is a schematic diagram of a load sharing method in Example 6 according to an embodiment of this disclosure.

For example, as shown in FIG. 7C, Table 1 is used as an example. An RM value is 0b10, indicating that the load sharing rule 1, namely, the flow-based path selection mode, is used to select a path from all feasible paths. A data flow 1 from a host 1 to a host 2 is used as an example. RM values of data packets belonging to the data flow 1 are all 0b10. As shown in FIG. 7C, values of LB fields of four data packets belonging to the data flow are respectively LB1, LB1, LB2, and LB2. Therefore, when receiving the data packets belonging to the data flow 1, a switch 1 determines that there are two shortest feasible paths from the switch 1 to the host 2, and may perform a hash operation based on a value of the LB field (or a value of the LB field and a quintuple) to select a transmission path from the two shortest feasible paths for transmission. Data packets with a same LB value are forwarded through a same shortest feasible path, and data packets with different LB values are forwarded through different shortest feasible paths.

Example 7: An eleventh possible example is described as follows: A transmit end side indicates, in a data packet included in a data flow, a switch to use the load sharing rule 3. In a manner, when the load sharing rule 3 is used, an LB value may be configured to be a default value. In another manner, when the load sharing rule 3 is used, the data packet may not include the LB.

Figure 8:
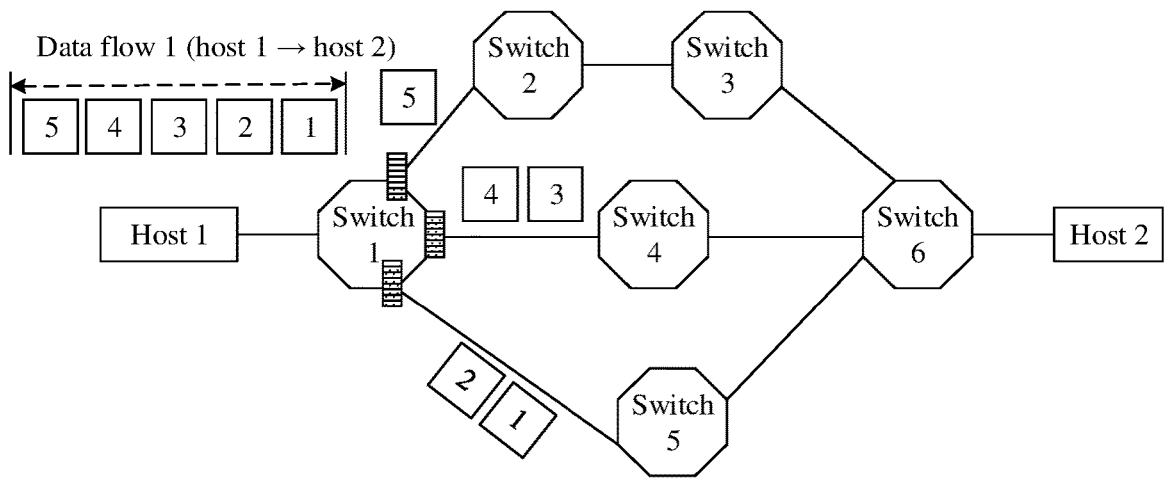
FIG. 8 is a schematic diagram of a load sharing method in Example 7 according to an embodiment of this disclosure.

For example, as shown in FIG. 8, Table 1 is used as an example. An RM value is 0b01, indicating that the load sharing rule 3, namely, the adaptive routing path selection mode, is used to select a path from all feasible paths. A data flow 1 from a host 1 to a host 2 is used as an example. RM values of data packets belonging to the data flow 1 are all 0b01. When receiving a data packet whose RM value is 0b01, a switch selects a path from all feasible paths configured in a routing table based on a cost value of each egress port and a congestion degree of an egress port queue. For example, a transmission path with a shortest distance is selected from transmission paths whose congestion degrees are less than a first threshold. In an example, the switch may determine an egress port with a lowest cost value based on the routing table, that is, select a shortest feasible path. If there are a plurality of shortest feasible paths, a shortest feasible path with a lowest load, namely, an egress port with a lowest load, is selected. If the congestion degree of the egress port of the shortest feasible path exceeds a first threshold, a non-congested egress port with a second highest cost value is selected. The rest may be deduced by analogy. As shown in FIG. 8, a transmission path of a switch 1→a switch 5→a switch 6 and a transmission path of a switch 1→a switch 4→a switch 6 have a same distance, and are both shortest feasible paths. After receiving a data packet 1 from the host 1, the switch 1 determines two shortest feasible paths, selects from the shortest feasible paths a transmission path with a lowest load: the switch 1→the switch 5→the switch 6, and forwards the data packet 1 to the switch 5. After the switch 1 receives a data packet 2, a transmission path with a lowest load is still: the switch 1→the switch 5→the switch 6, and the data packet 2 is forwarded to the switch 5. After the switch 1 receives a data packet 3, a transmission path with a lowest load is: the switch 1→the switch 4→the switch 6, and the data packet 3 is forwarded to the switch 4. After the switch 1 receives a data packet 4, a transmission path with a lowest load is: the switch 1→the switch 4→the switch 6, and the data packet 4 is forwarded to the switch 5. When the data packet 5 is received, congestion degrees of the two shortest feasible paths are greater than the first threshold, so that a transmission path with a slightly longer distance is selected: the switch 1→the switch 2→the switch 3→the switch 6. The switch 1 forwards the data packet 5 to the switch 2.

Example 8: A twelfth possible example is described as follows: A transmit end side indicates, in a data packet included in a data flow, a switch to use the load sharing rule 3. In a manner, when the load sharing rule 4 is used, an LB value may be configured to be a default value. In another manner, when the load sharing rule 4 is used, the data packet may not include the LB.

Figure 9:
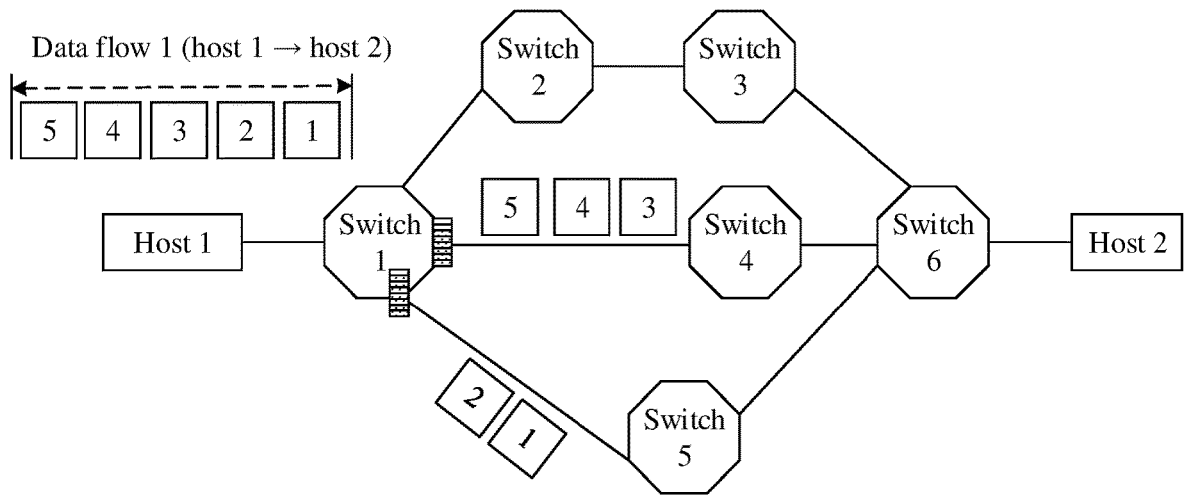
FIG. 9 is a schematic diagram of a load sharing method in Example 8 according to an embodiment of this disclosure.

For example, as shown in FIG. 9, Table 1 is used as an example. An RM value is 0b11, indicating that the load sharing rule 4, namely, the adaptive routing path selection mode, is used to select a path from shortest feasible paths. A data flow 1 from a host 1 to a host 2 is used as an example. RM values of data packets belonging to the data flow 1 are all 0b11. When receiving a data packet whose RM value is 0b11, a switch selects a path from all feasible paths configured in a routing table based on a cost value of each egress port. For example, a shortest feasible path with a lowest load is selected. In an example, the switch may determine an egress port with a lowest cost value based on the routing table, that is, select a shortest feasible path. If there are a plurality of shortest feasible paths, a shortest feasible path with a lowest load, namely, an egress port with a lowest load, is selected. As shown in FIG. 9, a transmission path of a switch 1→a switch 5→a switch 6 and a transmission path of a switch 1→a switch 4→a switch 6 have a same distance, and are both shortest feasible paths. After receiving a data packet 1 from the host 1, the switch 1 determines two shortest feasible paths, selects from the shortest feasible paths a transmission path with a lowest load: the switch 1→the switch 5→the switch 6, and forwards the data packet 1 to the switch 5. After the switch 1 receives a data packet 2, a transmission path with a lowest load is still: the switch 1→the switch 5→the switch 6, and the data packet 2 is forwarded to the switch 5. After the switch 1 receives a data packet 3, a transmission path with a lowest load is: the switch 1→the switch 4→the switch 6, and the data packet 3 is forwarded to the switch 4. After the switch 1 receives a data packet 4, a transmission path with a lowest load is: the switch 1→the switch 4→the switch 6, and the data packet 4 is forwarded to the switch 5. When the data packet 5 is received, congestion degrees of the two shortest feasible paths are greater than the first threshold, so that a transmission path with a slightly longer distance is selected: the switch 1→the switch 2→the switch 3→the switch 6. The switch 1 forwards the data packet 5 to the switch 2.

Figure 10:
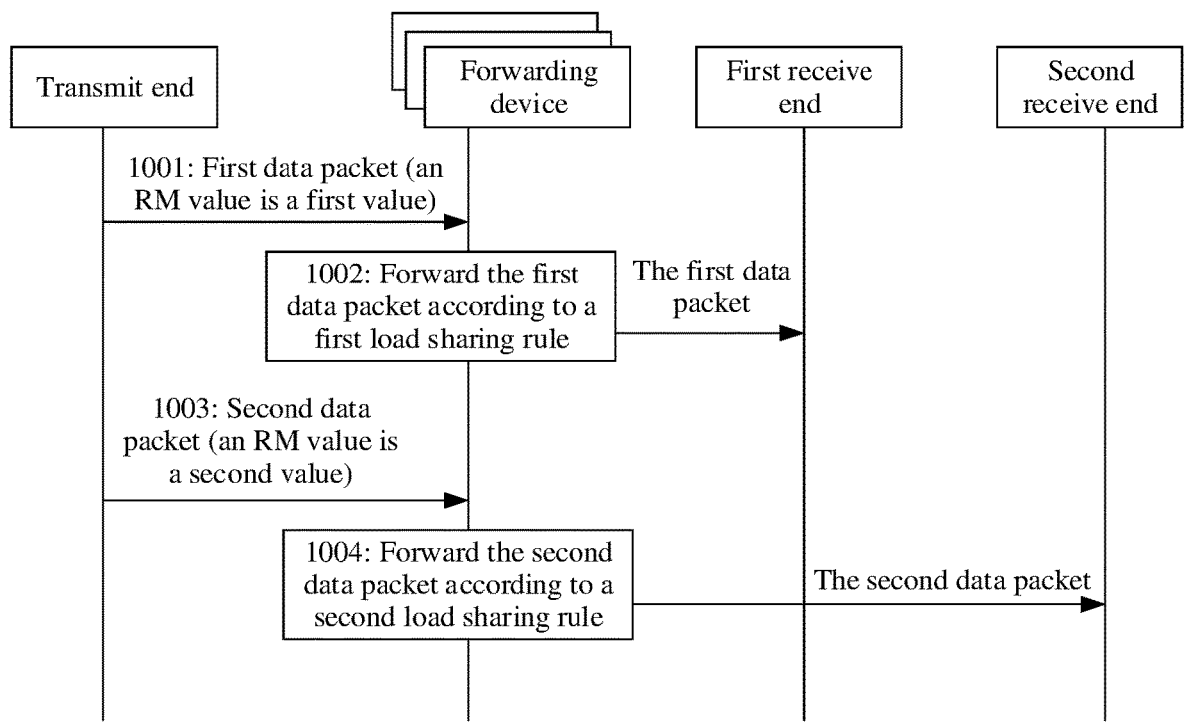
FIG. 10 is a schematic flowchart of a possible load sharing method according to an embodiment of this disclosure.

In this embodiment of this disclosure, a transmit end may indicate the forwarding device to use different load sharing rules for data flows of different flow types. FIG. 10 is a schematic flowchart of a possible load sharing method according to an embodiment of this disclosure. The load sharing method may be performed by a transmit end, for example, may be performed by a network card in a device at the transmit end.

1001: The transmit end sends a first data packet to a forwarding device, where the first data packet belongs to a first data flow, a value of an RM included in the first data packet is a first value, and the first value indicates the forwarding device to forward the first data packet according to a first load sharing rule. The forwarding device may be a device that has a data packet forwarding function, such as a switch or a router.

1002: Any forwarding device in a transmission path forwards the first data packet to a next hop according to the first load sharing rule based on the value of the RM being the first value, until the first data packet reaches a receive end corresponding to the first data flow. In FIG. 10, an example in which the receive end corresponding to the first data flow is a first receive end is used.

1003: The transmit end sends a second data packet to the forwarding device, where the second data packet belongs to a second data flow, a value of an RM included in the second data packet is a second value, and the second value indicates the forwarding device to forward the second data packet according to a second load sharing rule.

1004: Any forwarding device in the transmission path forwards the second data packet to a next hop according to the second load sharing rule based on the value of the RM being the second value, until the second data packet reaches a receive end corresponding to the second data flow. In FIG. 10, an example in which a receive end corresponding to the second data flow is a second receive end is used.

A flow type of the first data flow may be a mouse flow, and a flow type of the second data flow may be an elephant flow.

An execution sequence of step 1001 and step 1003 is not limited in this embodiment of this disclosure. For example, step 1001 may be performed before step 1003, or step 1003 may be performed before step 1001.

According to the method provided in this embodiment of this disclosure, the transmit end indicates, for data flows of different flow types, the switch to use different load sharing rules, so that a load sharing rule does not need to be globally configured for the switch. Therefore, different load sharing rules may be used by the switch for different data flows, and are applicable to a scenario of complex networking and hybrid traffic.

In a possible implementation, for a mouse flow, an adaptive routing path selection mode may be used. For example, the first load sharing rule may be the load sharing rule 3 and the load sharing rule 4. For an elephant flow, a flow-based path selection mode may be used. For example, the second load sharing rule may be the load sharing rule 3 and the load sharing rule 4.

In some embodiments, the transmit end may determine a flow type of a data flow based on a service type and/or a data volume of the data flow. In an example, a transactional data flow, a data flow generated by WWW browsing, or a data flow generated by search and query belongs to a mouse flow. For example, a data flow generated by data backup or virtual machine migration belongs to an elephant flow. In another example, if determining that traffic of a to-be-sent data flow is greater than a traffic threshold, the transmit end determines that the data flow belongs to an elephant flow; or if determining that traffic of a to-be-sent data flow is less than or equal to a traffic threshold, the transmit end determines that the data flow belongs to a mouse flow. The traffic threshold may be an empirical value for distinguishing an elephant flow from a mouse flow.

In this embodiment of this disclosure, an operation of encapsulating and sending a data packet may be implemented by a network card. In one manner, the network card may determine a flow type of a data flow based on a service type and/or a data volume of the data flow. In another manner, a processor may send a traffic characteristic of a data flow to the network card. For example, the processor may indicate, to the network card, that a flow type of a to-be-sent data flow is an elephant flow or a mouse flow.

In another possible implementation, the transmit end may determine, based on a capability of the receive end for reordering disordered packets and the flow type of the to-be-sent data flow, a load sharing rule used by the forwarding device. For the capability of the receive end for reordering disordered packets, the transmit end may be configured by a controller or manually, or the receive end may exchange information with the transmit end, to send capability information to the peer end. The capability information indicates whether the receive end has the capability for reordering disordered packets. The first data flow is used as an example. The first data flow is a data flow sent to the first receive end. The transmit end may obtain capability information of the first receive end from the first receive end, where the capability information of the first receive end indicates whether the first receive end has a capability for reordering disordered packets.

The following uses the first data flow as an example. The first data flow is a mouse flow, and an example in which the first data flow is sent to the first receive end is used.

In an example, if the first receive end has the capability for reordering disordered packets, an adaptive routing path selection mode may be used for the mouse flow, for example, the load sharing rule 3 or the load sharing rule 4. Table 1 is used as an example. When sending the first data flow, the transmit end may encapsulate 0b01 or 0b11 into an RM field of a data packet of the first data flow. In an example, 0b01 encapsulation is used as an example. When receiving the first data flow and determining that a value of the RM field is 0b01, the forwarding device selects, from transmission paths based on distances and congestion degrees of the transmission paths to the first receive end, a first forwarding path for forwarding the first data packet. For example, the first forwarding path is a transmission path with a shortest distance in transmission paths whose congestion degrees are less than a first threshold. In another example, 0b11 encapsulation is used as an example. When receiving the first data packet, the forwarding device determines that a value of the RM field is 0b11, and selects a shortest feasible path with a lowest load.

In another example, if the first receive end does not have the capability for reordering disordered packets, a flow-based path selection mode may be used for the mouse flow, for example, the load sharing rule 2. The forwarding device is indicated to select a transmission path based on an LB. For example, the manner in the sixth possible example may be used. For another example, the manner in the tenth possible example may be used. Table 1 is used as an example. When sending the first data flow, the transmit end may encapsulate 0b10 into an RM field of a data packet of the first data flow. When receiving the first data packet, the forwarding device determines that a value of the RM field is 0b10, and performs a hash operation based on the LB (or the LB and a quintuple), to select a forwarding path from shortest feasible paths.

For example, in the manner in the sixth possible example, for a first data packet and a third data packet that belong to the first data flow, values of RMs included in the first data packet and the third data packet are the same, and values of LBs included in the first data packet and the third data packet are also the same. For another example, in the manner in the tenth possible example, values of RMs included in the first data packet and the third data packet are the same. When a sending time interval between the third data packet and the first data packet is greater than first duration, the value of the LB in the third data packet is different from the value of the LB in the first data packet; or when a sending time interval between the third data packet and the first data packet is less than or equal to first duration, the value of the LB in the third data packet is different from the value of the LB in the first data packet.

The following uses the second data flow as an example. The second data flow is an elephant flow, and an example in which the second data flow is sent to the second receive end is used.

In an example, the second receive end does not have a capability for reordering disordered packets. A flow-based path selection mode is used, for example, the load sharing rule 1. The transmit end indicates the forwarding device to select a transmission path from all feasible paths based on the LB. For example, the manner in the first possible example may be used. For another example, the manner in the sixth possible example may be used. Table 1 is used as an example. When sending the second data flow, the transmit end may encapsulate 0b00 into an RM field of a data packet of the second data flow. When receiving the second data packet, the forwarding device determines that a value of the RM field is 0b00, and performs a hash operation based on the LB (or the LB and a quintuple), to select a forwarding path from all feasible paths.

For example, in an example in which the transmit end sends the second data packet and a fourth data packet that belong to the second data flow, when the manner in the first possible example is used, a value of an LB in the fourth data packet is the same as the value of the LB in the second data packet. When the manner in the sixth possible example is used, when the fourth data packet is adjacent to the second data packet and a sending time interval between the fourth data packet and the second data packet is greater than second duration, the value of the LB in the fourth data packet is different from the value of the LB in the second data packet; or when the fourth data packet is adjacent to the second data packet and a sending time interval between the fourth data packet and the second data packet is less than or equal to second duration, the value of the LB in the fourth data packet is the same as the value of the LB in the second data packet.

In another example, the second receive end has a capability for reordering disordered packets. In some embodiments, a flow-based path selection mode may be used, for example, the load sharing rule 1. The transmit end indicates the forwarding device to select a transmission path from all feasible paths based on the LB. For example, the manner in the second possible example may be used. For another example, the manner in the third possible example may be used. For another example, the manner in the fourth possible example may be used. For example, the manner in the fifth possible example may be used. Table 1 is used as an example. When sending the second data flow, the transmit end may encapsulate 0b00 into an RM field of a data packet of the second data flow. When receiving the second data packet, the forwarding device determines that a value of the RM field is 0b00, and performs a hash operation based on the LB (or the LB and a quintuple), to select a forwarding path from all feasible paths. In some other embodiments, an adaptive routing path selection mode may be used, and a path is selected from all feasible paths. For example, the load sharing rule 3 is used.

For example, in an example in which the transmit end sends the second data packet and a fifth data packet that belong to the second data flow, when the manner in the second possible example is used and the fifth data packet is adjacent to the second data packet, a value of an LB in the fifth data packet is different from the value of the LB in the second data packet. When the manner in the third possible example is used, when a quantity of packets between the fifth data packet and the second data packet is greater than a second quantity, the value of the LB in the fifth data packet is different from the value of the LB in the second data packet; or when a quantity of packets between the fifth data packet and the second data packet is less than or equal to a second quantity, the value of the LB in the fifth data packet is the same as the value of the LB in the second data packet. When the manner in the fourth possible example is used, when the fifth data packet and the second data packet do not belong to a same time period, the value of the LB in the fifth data packet is different from the value of the LB in the second data packet; or when the fifth data packet and the second data packet belong to a same time period, the value of the LB in the fifth data packet is the same as the value of the LB in the second data packet. When the manner in the fifth possible example is used, when a quantity of packets between the fifth data packet and the second data packet is greater than a second quantity, the value of the LB in the fifth data packet is different from the value of the LB in the second data packet; or when a quantity of packets between the fifth data packet and the second data packet is less than or equal to a second quantity, the value of the LB in the fifth data packet is the same as the value of the LB in the second data packet.

In an example, with reference to a correspondence between an RM value and a load sharing rule in Table 1, the transmit end determines, based on a flow type and the capability of the receive end for reordering disordered packets, values of an RM and an LB that are encapsulated in a data packet. Refer to Table 3. It should be understood that Table 3 is merely used as an example, and does not constitute a specific limitation.

TABLE 3

| Flow type | Peer capability | RM | LB |
|---|---|---|---|
| Mouse flow (delay-sensitive) | Not have a capability for reordering disordered packets. | 0b10 | LBs of data packets in a same data flow remain unchanged, and different data flows use different LBs. |
| Mouse flow (delay-sensitive) | Have a capability for reordering disordered packets. | 0b01/0b11 | The RM indicates adaptive routing, and the LB is meaningless. The LB may use a default value, or a data packet does not include an LB field. |
| Elephant flow (bandwidth-sensitive) | Not have a capability for reordering disordered packets. | 0b00 | LBs of data packets in a same data flow remain unchanged, or LB switching is performed in the data flow based on a burst interval. |
| Elephant flow (bandwidth-sensitive) | Have a capability for reordering disordered packets. | 0b00/0b01 | When RM = 0b00, LBs included in data packets in a same data flow are switched packet by packet or every N packets. When RM = 0b01, it indicates adaptive routing, and LB is meaningless. LB may use a default value, or a data packet does not include an LB field. |

With reference to a specific network application scenario, the following describes in detail the solutions provided in embodiments of this disclosure by using an example.

Figure 11:
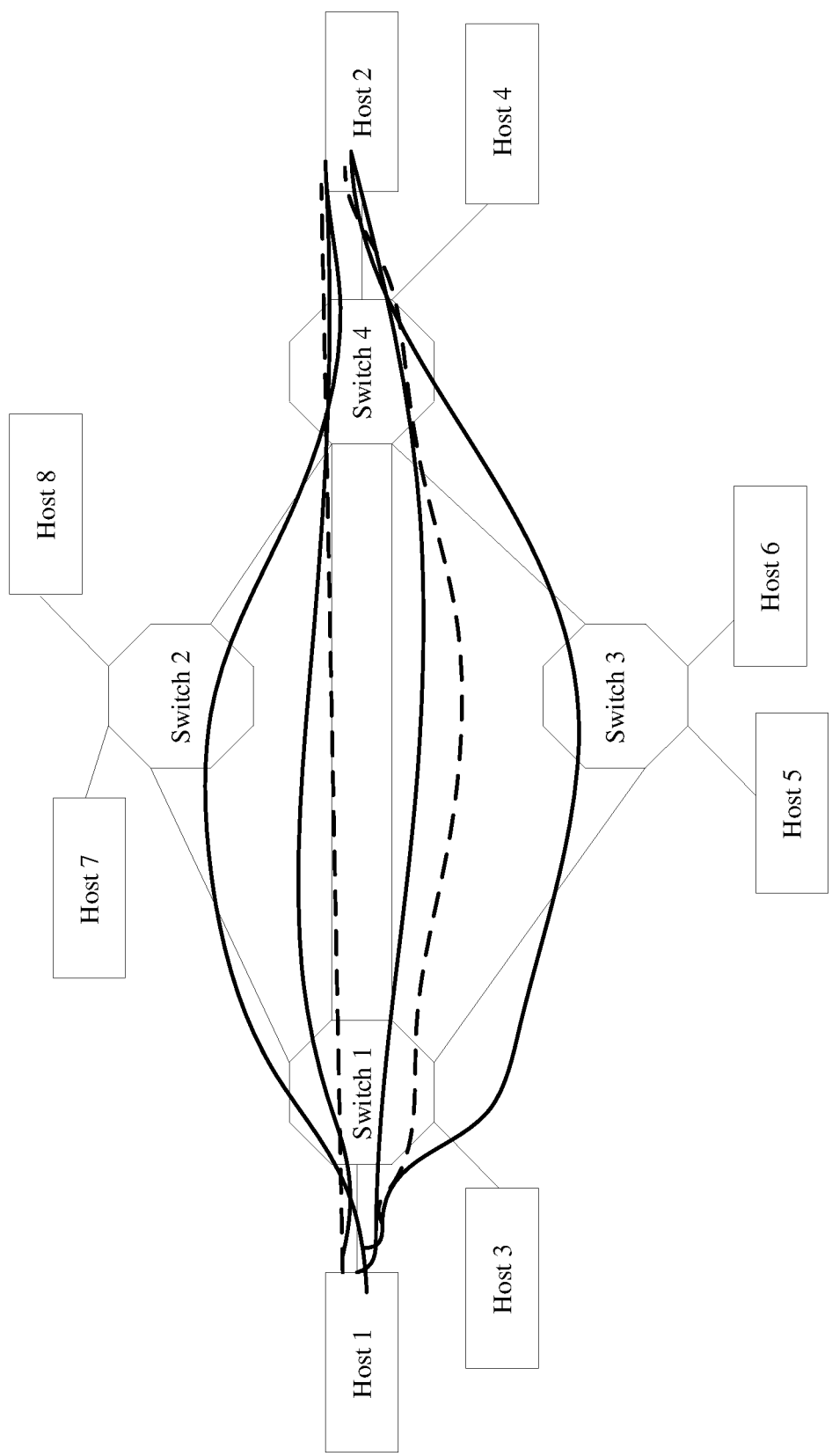
FIG. 11 is a schematic diagram of a possible network scenario according to an embodiment of this disclosure.

In an example application scenario, in a network scenario shown in FIG. 11, a host 1 sends four data flows to a host 2. For example, two data flows are elephant flows, and are represented by solid lines in FIG. 11. The other two data flows are mouse flows, and are represented by dashed lines in FIG. 11. The host 2 has a capability for reordering disordered packets. Therefore, different data packets of a same data flow sent by the host 1 to the host 2 may be transmitted on different paths. Table 3 is used as an example. When the host 1 sends the two elephant flows to the host 2, a value of an RM in a plurality of data packets included in the two elephant flows is 0b00, so that each switch is indicated to use a flow-based path selection mode and select a path from all feasible paths. For each elephant flow, when encapsulating a data packet, the host 1 may switch a value of an LB packet by packet, or switch a value of an LB once for a plurality of data packets. Therefore, the switch performs forwarding based on the RM and the LB, so that the two elephant flows can be evenly shared to four feasible paths.

When the host 1 sends the two mouse flows to the host 2, a value of an RM in a plurality of data packets included in the two mouse flows is 0b11, so that each switch is indicated to use an adaptive routing path selection mode, and select a shortest feasible path from paths configured in a routing table. As shown in FIG. 11, there are two shortest feasible paths between the host 1 and the host 2. Therefore, when forwarding the data packets in the two mouse flows based on the RM, the switch may select a shortest feasible path with a lowest load for each data packet in real time. Therefore, the data packets in the two mouse flows are transmitted on a transmission path with a lowest load in the two shortest feasible paths in the middle.

From the foregoing application scenario, it may be learned that in this embodiment of this disclosure, a large data flow with a bandwidth priority is distributed to all feasible paths to a greatest extent, so that a large bandwidth of a plurality of paths is fully utilized. A small data flow with a delay priority is transmitted on a shortest path with a lowest load to a greatest extent, so that a low latency of the shortest path is fully enjoyed. Data packets sent through a network card carry RM and LB fields, so that the transmit end differentially provides different forwarding policies for different traffic to implement differentiated services.

In an existing network, a terminal side and a switch do not cooperate better to implement better load sharing. The switch cannot sense requirements of the terminal side. Generally, fixed load sharing rules are configured to meet only one requirement of a high bandwidth and a low latency, but cannot simultaneously meet requirements of two flow types. In this disclosure, the transmit end transmits the RM and LB fields through a network based on a traffic characteristic and a capability of a peer network card, to notify switches along a path of requirements of the terminal side, and the switches along the path implement a corresponding load sharing technology based on the requirements expressed by the RM and LB fields brought by the network card. In this embodiment of this disclosure, based on a capability of a network card of a peer end, an elephant flow with a large bandwidth is shared to all paths, and a mouse flow with a low latency is transmitted through a shortest path, so that different requirements of two flow types are simultaneously met.

Figure 12:
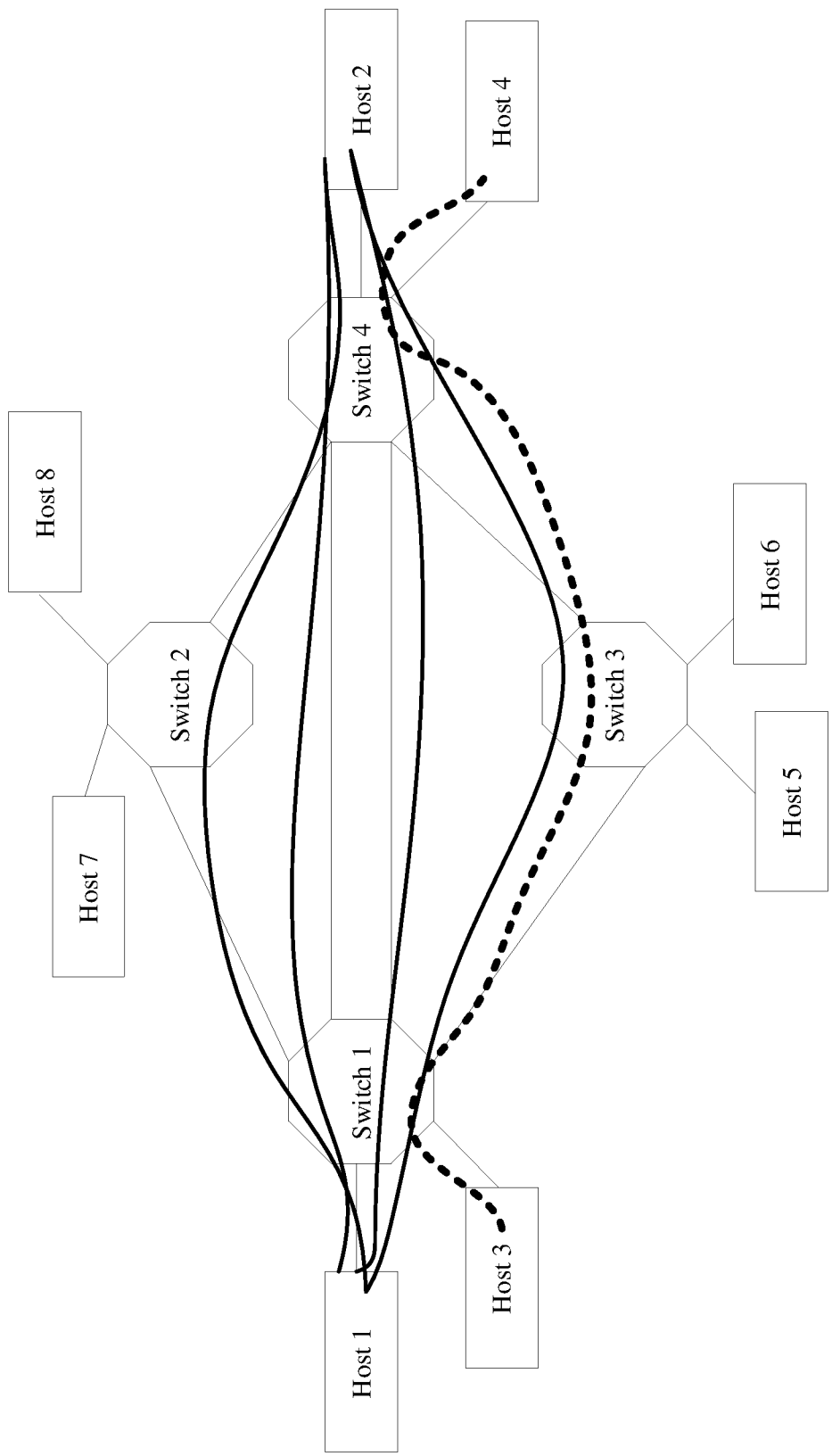
FIG. 12 is a schematic diagram of another possible network scenario according to an embodiment of this disclosure.

In an example application scenario, in a network scenario shown in FIG. 12, a host 1 sends four data flows to a host 2. It is assumed that the four data flows are all elephant flows, and are represented by solid lines in FIG. 12. A host 3 sends one data flow to a host 4, and the data flow is an elephant flow. The host 2 has a capability for reordering disordered packets, and different data packets of a same data flow may be transmitted on different transmission paths. The host 4 does not have a capability of reordering disordered packets.

Table 3 is used as an example. When the host 1 sends the four elephant flows to the host 2, in an example, a value of an RM in a plurality of data packets included in the four elephant flows is 0b00, so that each switch is indicated to use a flow-based path selection mode and select a path from all feasible paths. For each elephant flow, when encapsulating a data packet, the host 1 may switch a value of an LB packet by packet, or switch a value of an LB once for a plurality of data packets. Therefore, the switch performs forwarding based on the RM and the LB, so that the four elephant flows can be evenly shared to four feasible paths. In another example, a value of an RM in a plurality of data packets included in four elephant flows sent by the host 1 to the host 2 is configured as 0b01, so that each switch is indicated to use an adaptive routing path selection mode and select a path from all feasible paths. The value of the LB may be a default value. Therefore, when forwarding each data packet based on the RM and the LB, the switch selects a transmission path with a lowest load based on a load of the transmission path, so that each data packet included in the four elephant flows can be shared in real time to the transmission path with the lowest load for transmission.

When the host 3 sends one elephant flow to the host 4, a value of an RM in a plurality of data packets included in the four elephant flows is 0b00, so that each switch is indicated to use a flow-based path selection mode and select a path from all feasible paths. Because the host 4 does not have the capability for reordering disordered packets, the host 3 does not switch the value of the LB when encapsulating a data packet for the elephant flow, and all data packets in the elephant flow are transmitted through a feasible path.

From the foregoing application scenario, it may be learned that in this embodiment of this disclosure, for an elephant flow for a receive end not having a capability for reordering disordered packets, a path is selected based on the flow, and the data flow is transmitted through one path based on the value of the LB, so that disordered data packets are avoided in the data flow. For an elephant flow for a receive end having a capability for reordering disordered packets, a transmission path with a lowest load is flexibly selected based on the adaptive routing path selection mode, or the value of the LB is switched, so that the elephant flow can be evenly shared to the four feasible paths. In this embodiment of this disclosure, a data flow that cannot be disordered occupies one path, and a data flow that can be disordered is forwarded based on a load. For hybrid networking with different capabilities for reordering disordered packets, bandwidths of all feasible paths may be fully used. However, an existing network switch cannot sense a capability of a terminal side for reordering disordered packets. For hybrid networking with different capabilities for reordering disordered packets, a flow-based load sharing technology can only be used in a one-size-fits-all manner. As a result, congestion on some paths in the network is aggravated.

Figure 13:
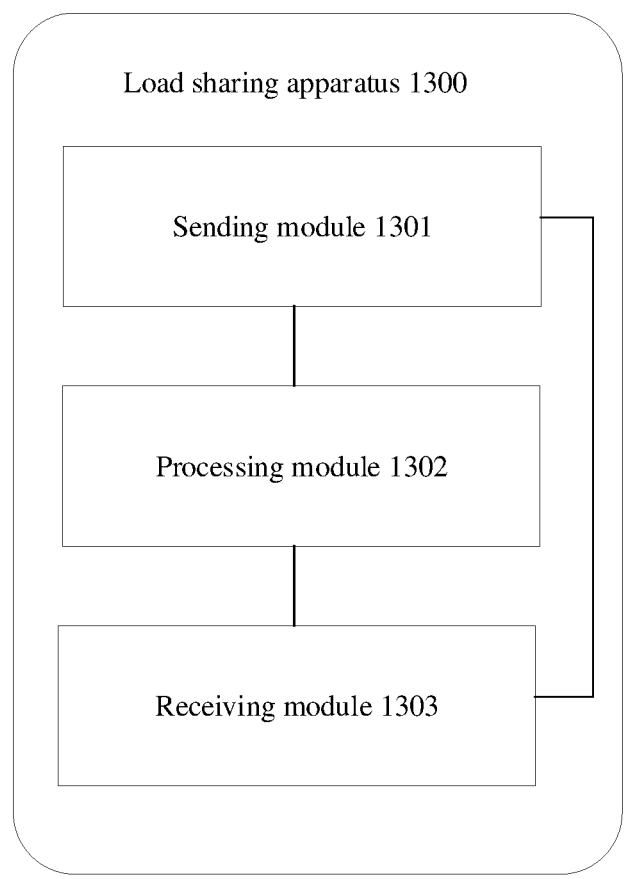
FIG. 13 is a schematic diagram of a structure of a load sharing apparatus according to an embodiment of this disclosure.

Based on a technical concept the same as that of the foregoing method, an embodiment of this disclosure provides a load sharing apparatus 1300, as shown in FIG. 13. The load sharing apparatus 1300 may include a sending module 1301. The load sharing apparatus 1300 may further include a processing module 1302. The load sharing apparatus 1300 may further include a receiving module 1303.

In a possible application scenario, the apparatus 1300 may be applied to a network device, that is, may be applied to a sending device, and may be implemented by a processor in the network device, or may be implemented by a network card in the network device. The load sharing apparatus 1300 is configured to implement the method implemented by the host, the processor, or the network card in any one of the foregoing embodiments.

The sending module 1301 is configured to send a first data packet to a forwarding device, where the first data packet belongs to a first data flow, a value of a first field included in the first data packet is a first value, and the first value indicates the forwarding device to forward the first data packet according to a first load sharing rule; and send a second data packet to the forwarding device, where the second data packet belongs to a second data flow, a value of a first field included in the second data packet is a second value, the second value indicates the forwarding device to forward the second data packet according to a second load sharing rule, and a flow type of the first data flow is different from a flow type of the second data flow. In a possible implementation, the flow type of the first data flow is a mouse flow, and the flow type of the second data flow is an elephant flow.

In a possible implementation, the processing module 1302 may further: before the sending module 1301 sends the first data packet to the forwarding device, determine, based on a service type or a data volume of the first data flow, that the flow type of the first data flow is a mouse flow; or before sending the second data packet to the forwarding device, determine, based on a service type or a data volume of the second data flow, that the flow type of the second data flow is an elephant flow.

In a possible implementation, the first data flow is a data flow sent to a first receive end. The processing module 1302 is further configured to: determine, based on a capability of the first receive end for reordering disordered packets and the flow type of the first data flow, that the forwarding device forwards the first data flow according to the first load sharing rule.

In a possible implementation, the receiving module 1303 may further receive capability information from the first receive end, where the capability information indicates whether the first receive end has the capability for reordering disordered packets.

In a possible implementation, the second data flow is a data flow sent to a second receive end. The processing module 1302 may further determine, based on a capability of the second receive end for reordering disordered packets and the flow type of the second data flow, that the forwarding device forwards the second data flow according to the second load sharing rule.

In a possible implementation, the first receive end has the capability for reordering disordered packets. The first load sharing rule is: selecting, from different transmission paths based on distances and congestion degrees of the different transmission paths to the first receive end, a transmission path for forwarding the first data packet; or using a shortest path to the first receive end as a forwarding path for forwarding the first data packet.

In a possible implementation, the first receive end does not have the capability for reordering disordered packets. The first data packet further includes a second field. A value of the second field included in the first data packet indicates a load sharing factor of the first data packet. The first load sharing rule is: using, based on the load sharing factor, a shortest path to the first receive end as a forwarding path for forwarding the first data packet.

In a possible implementation, the sending module 1301 may further send a third data packet to the forwarding device, where the third data packet belongs to the first data flow, a value of a first field included in the third data packet is the first value, a destination address of the third data packet indicates the second receive end, the third data packet further includes a second field, and a value of the second field included in the third data packet indicates a load sharing factor of the third data packet.

The value of the second field in the third data packet is the same as the value of the second field in the first data packet; or when a sending time interval between the third data packet and the first data packet is greater than first duration, the value of the second field in the third data packet is different from the value of the second field in the first data packet; or when a sending time interval between the third data packet and the first data packet is less than or equal to first duration, the value of the second field in the third data packet is different from the value of the second field in the first data packet.

In a possible implementation, the second data packet further includes a second field. A value of the second field included in the second data packet indicates a load sharing factor of the second data packet. A value of the second field in the second data packet is different from a value of a second field in the third data packet.

In a possible implementation, the second data packet further includes a second field. A value of the second field included in the second data packet indicates a load sharing factor of the second data packet. The second load sharing rule is: selecting, based on the load sharing factor and from at least one transmission path to the second receive end, a forwarding path for forwarding the second data packet.

In a possible implementation, the second receive end does not have the capability for reordering disordered packets. The sending module 1301 is further configured to send a fourth data packet to the forwarding device, where the fourth data packet belongs to the second data flow, a value of a first field included in the fourth data packet is the second value, the fourth data packet further includes a second field, and a value of the second field included in the fourth data packet indicates a load sharing factor of the fourth data packet.

The value of the second field in the fourth data packet is the same as the value of the second field in the second data packet; or when the fourth data packet is adjacent to the second data packet and a sending time interval between the fourth data packet and the second data packet is greater than second duration, the value of the second field in the fourth data packet is different from the value of the second field in the second data packet; or when the fourth data packet is adjacent to the second data packet and a sending time interval between the fourth data packet and the second data packet is less than or equal to second duration, the value of the second field in the fourth data packet is the same as the value of the second field in the second data packet.

In a possible implementation, the second receive end has the capability for reordering disordered packets. The sending module 1301 is further configured to send a fifth data packet to the forwarding device, where the fifth data packet belongs to the second data flow, a value of a first field included in the fifth data packet is the second value, the fifth data packet further includes a second field, and a value of the second field included in the fifth data packet indicates a load sharing factor of the fifth data packet. The value of the second field in the fifth data packet is different from the value of the second field in the second data packet; or when a sending time interval between the fifth data packet and the second data packet is greater than second duration, the value of the second field in the fifth data packet is different from the value of the second field in the second data packet; or when a sending time interval between the fifth data packet and the second data packet is less than or equal to second duration, the value of the second field in the fifth data packet is the same as a value of the second field in the second data packet; or when a quantity of packets between the fifth data packet and the second data packet is greater than a second quantity, the value of the second field in the fifth data packet is different from the value of the second field in the second data packet; or when a quantity of packets between the fifth data packet and the second data packet is less than or equal to a second quantity, the value of the second field in the fifth data packet is the same as the value of the second field in the second data packet.

In another possible application scenario, the apparatus 1300 may be further applied to a forwarding device, and may be implemented by a processor in the forwarding device, or may be implemented by a network card in the forwarding device. The load sharing apparatus 1300 is configured to implement the method implemented by the forwarding device, the switch, or the processor in any one of the foregoing embodiments.

The receiving module 1303 is configured to receive a first data packet, where the first data packet belongs to a first data flow, a value of a first field included in the first data packet is a first value; and receive a second data packet, where the second data packet belongs to a second data flow, a value of a first field included in the second data packet is a second value. The sending module 1301 is configured to forward the first data packet according to a first load sharing rule indicated by the first value; and forward the second data packet according to a second load sharing rule indicated by the second value. A flow type of the first data flow may be different from a flow type of the second data flow. In a possible implementation, the flow type of the first data flow may be a mouse flow, and the flow type of the second data flow may be an elephant flow.

In a possible implementation, the first data flow is a data flow sent to a first receive end. The processing module 1302 is specifically configured to: when the value of the first field is the first value, select, from transmission paths based on distances and congestion degrees of the transmission paths to the first receive end, a first forwarding path for forwarding the first data packet.

The first forwarding path is a transmission path with a shortest distance to the first receive end in transmission paths whose congestion degrees are less than a first threshold.

In a possible implementation, the first data flow is a data flow sent to a first receive end. The first data packet further includes a second field. The second field indicates a load sharing factor. The processing module 1302 is specifically configured to: when the value of the first field is the first value, select, based on the load sharing factor and from at least one shortest path to the first receive end, a forwarding path for forwarding the first data packet.

In a possible implementation, the first data packet includes a first destination address. The first destination address indicates the first receive end. The processing module 1302 is specifically configured to: determine, based on a routing table, at least one egress port that corresponds to the first destination address and whose cost values are in an ascending order, where the routing table includes a plurality of egress ports corresponding to the first destination address and a cost value corresponding to each egress port, and the cost value indicates a distance of a transmission path from the egress port corresponding to the cost value to the first receive end; and select a first egress port from the at least one egress port, where a congestion degree of the first egress port is less than a first threshold, and the first egress port is an egress port with a lowest load in the at least one egress port.

In a possible implementation, the second data flow is a data flow sent to a second receive end. The processing module 1302 is specifically configured to: when the value of the first field is the second value, select, based on the load sharing factor and from at least one transmission path to the second receive end, a forwarding path for forwarding the second data packet.

Figure 14:
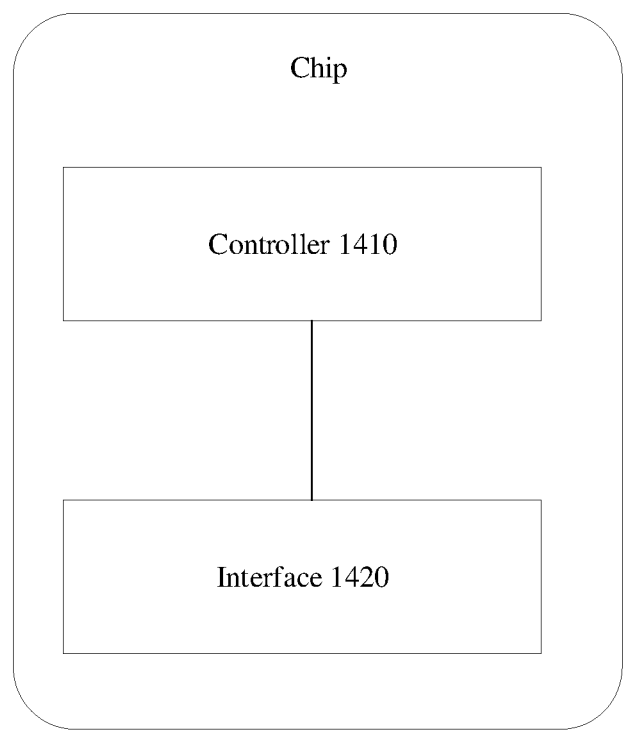
FIG. 14 is a schematic diagram of a structure of a chip according to an embodiment of this disclosure.

FIG. 14 is a block diagram of a structure of a chip according to another embodiment of this disclosure. As shown in FIG. 14, the chip in this embodiment may include a controller 1410 and an interface 1420. The controller 1410 and the interface 1420 cooperate with each other, so that the chip performs the method performed by the network card or the method performed by the processor in the foregoing embodiments. The controller 1410 may be a central processing unit (CPU), a general-purpose processor, a co-controller, a digital signal processor (DSP), an application-specific integrated circuit (application-specific integrated circuit), a field programmable gate array (field programmable gate array) or another programmable logic device, a transistor logic device, a hardware component, or any combination thereof. Alternatively, the controller may be a combination that implements a computing function, for example, a combination of one or more microcontrollers, or a combination of a DSP and a microcontroller.

In addition, this disclosure further provides a computer-readable storage medium. The computer-readable storage medium stores a computer program. When the computer program is executed by a computing device, the method implemented by the host, the switch, the processor, or the network card is implemented.

In addition, this disclosure further provides a computer program product. The computer program product includes computer instructions. When the computer instructions are executed by a computing device, the method implemented by the host, the switch, the processor, or the network card is implemented.

Based on a same technical concept, a problem-resolving principle of the load sharing apparatus provided in embodiments of this disclosure is similar to a problem-resolving principle of the method embodiments of this disclosure. Therefore, for implementation of each device, refer to implementation of the apparatus. For brevity of description, details are not described herein again.

A person skilled in the art should understand that embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to embodiments of this disclosure without departing from the scope of embodiments of this disclosure. This disclosure is intended to cover these modifications and variations provided that they fall within the scope of protection defined by the following claims and their equivalent technologies.

What is claimed is:

1. A load sharing method, applied to a transmit end, the method comprising:
   sending a first data packet to a forwarding device, wherein the first data packet belongs to a first data flow, a value of a first field comprised in the first data packet is a first value, and the first value indicates the forwarding device to forward the first data packet according to a first load sharing rule; and
   sending a second data packet to the forwarding device, wherein the second data packet belongs to a second data flow, a value of a first field comprised in the second data packet is a second value, and the second value indicates the forwarding device to forward the second data packet according to a second load sharing rule; and
   a first flow type of the first data flow is different from a second flow type of the second data flow; wherein
   the first flow type of the first data flow is a mouse flow, and the second flow type of the second data flow is an elephant flow;
   the first data flow is a data flow sent to a first receive end, and
   the method further comprises determining, based on a capability of the first receive end for reordering disordered packets and the first flow type of the first data flow, that the forwarding device forwards the first data flow according to the first load sharing rule.

2. The method according to claim 1, wherein the method further comprises:
   before sending the first data packet to the forwarding device, determining, based on a service type or a data volume of the first data flow, that the first flow type of the first data flow is the mouse flow; and
   before sending the second data packet to the forwarding device, determining, based on a service type or a data volume of the second data flow, that the second flow type of the second data flow is the elephant flow.

3. The method according to claim 1, wherein the method further comprises:
  receiving capability information from the first receive end, wherein the capability information indicates whether the first receive end has the capability for reordering disordered packets.

4. The method according to claim 1, wherein the second data flow is a data flow sent to a second receive end; and the method further comprises:
  determining, based on a capability of the second receive end for reordering disordered packets and the second flow type of the second data flow, that the forwarding device forwards the second data flow according to the second load sharing rule.

5. The method according to claim 4, wherein the first receive end does not have the capability for reordering disordered packets;
  the first data packet further comprises a second field, and a value of the second field comprised in the first data packet indicates a load sharing factor of the first data packet; and
  the first load sharing rule includes using, based on the load sharing factor, a shortest path to the first receive end as a forwarding path for forwarding the first data packet.

6. The method according to claim 1, wherein the first receive end has the capability for reordering disordered packets; and
  the first load sharing rule includes:
    selecting, from different transmission paths based on distances and congestion degrees of the different transmission paths to the first receive end, a transmission path for forwarding the first data packet; or
    using a shortest path to the first receive end as a forwarding path for forwarding the first data packet.

7. The method according to claim 1, wherein the first data packet further comprises a second field, and a value of the second field comprised in the first data packet indicates a load sharing factor for selecting a transmission path for forwarding the first data packet.

8. A load sharing method, applied to a forwarding device, the method comprising:
  receiving a first data packet, wherein the first data packet belongs to a first data flow, a value of a first field comprised in the first data packet is a first value, and forwarding the first data packet according to a first load sharing rule indicated by the first value; and
  receiving a second data packet, wherein the second data packet belongs to a second data flow, a value of a first field comprised in the second data packet is a second value, and forwarding the second data packet according to a second load sharing rule indicated by the second value; and
  a first flow type of the first data flow is different from a second flow type of the second data flow; wherein:
  the first data flow is a data flow sent to a first receive end, and the forwarding the first data packet according to the first load sharing rule indicated by the first value comprises:
  selecting, for transmission paths based on distances and congestion degrees of the transmission paths to the first receive end, a first forwarding path for forwarding the first data packet; and
  the first forwarding path is a transmission path with a shortest distance to the first receive end in the transmission paths whose congestion degrees are less than a threshold.

9. The method according to claim 8, wherein the first flow type of the first data flow is a mouse flow, and the second flow type of the second data flow is an elephant flow.

10. The method according to claim 9, wherein the first data flow is a data flow sent to a first receive end, the first data packet further comprises a second field, and the second field indicates a load sharing factor; and
  the forwarding the first data packet according to the first load sharing rule indicated by the first value comprises:
  selecting, based on the load sharing factor and from at least one shortest path to the first receive end, a forwarding path for forwarding the first data packet.

11. The method according to claim 8, wherein the first data packet further comprises a second field, and a value of the second field comprised in the first data packet indicates a load sharing factor for selecting the transmission path for forwarding the first data packet.

12. A load sharing apparatus comprising:
  at least one processor; and
  one or more memories coupled to the at least one processor and storing programming instructions for execution by the at least one processor to cause the apparatus to:
  send a first data packet to a forwarding device, wherein the first data packet belongs to a first data flow, a value of a first field comprised in the first data packet is a first value, and the first value indicates the forwarding device to forward the first data packet according to a first load sharing rule; and
  send a second data packet to the forwarding device, wherein the second data packet belongs to a second data flow, a value of a first field comprised in the second data packet is a second value, and the second value indicates the forwarding device to forward the second data packet according to a second load sharing rule; and
  a first flow type of the first data flow is different from a second flow type of the second data flow; wherein:
  the first flow type of the first data flow is a mouse flow, and the second flow type of the second data flow is an elephant flow;
  the first data flow is a data flow sent to a first receive end, and
  the apparatus is further configured to determine, based on a capability of the first receive end for reordering disordered packets and the first flow type of the first data flow, that the forwarding device forwards the first data flow according to the first load sharing rule.

13. The load sharing apparatus according to claim 12, wherein the first data packet further comprises a second field, and a value of the second field comprised in the first data packet indicates a load sharing factor for selecting a transmission path for forwarding the first data packet.

14. The load sharing apparatus according to claim 12, wherein the processor is further configured to:
  before sending the first data packet to the forwarding device, determine, based on a service type or a data volume of the first data flow, that the first flow type of the first data flow is the mouse flow; and
  before sending the second data packet to the forwarding device, determine, based on a service type or a data volume of the second data flow, that the second flow type of the second data flow is the elephant flow.

15. The load sharing apparatus according to claim 12, wherein the processor is further configured to:

receive capability information from the first receive end, wherein the capability information indicates whether the first receive end has the capability for reordering disordered packets.

16. The load sharing apparatus according to claim 12, wherein the second data flow is a data flow sent to a second receive end; and the processor is further configured to:
   determine, based on a capability of the second receive end for reordering disordered packets and the second flow type of the second data flow, that the forwarding device forwards the second data flow according to the second load sharing rule.

17. The load sharing apparatus according to claim 16, wherein the first receive end does not have the capability for reordering disordered packets;
   the first data packet further comprises a second field, and a value of the second field comprised in the first data packet indicates a load sharing factor of the first data packet; and
   the first load sharing rule includes: using, based on the load sharing factor, a shortest path to the first receive end as the first forwarding path for forwarding the first data packet.

18. The load sharing apparatus according to claim 12, wherein the first receive end has the capability for reordering disordered packets; and
   the first load sharing rule includes:
      selecting, from different transmission paths based on distances and congestion degrees of the different transmission paths to the first receive end, a transmission path for forwarding the first data packet; or
      using a shortest path to the first receive end as a forwarding path for forwarding the first data packet.

19. The method according to claim 8 wherein the first data packet further comprises a second field, and the second field indicates a load sharing factor; and the method further comprises:
   performing a hash operation on a value of the second field to obtain a hash value; and
   selecting, based on the hash value, the first forwarding path for forwarding the first data packet.

\* \* \* \* \*